(12) United States Patent
Pronovost

(10) Patent No.: US 12,371,057 B2
(45) Date of Patent: Jul. 29, 2025

(54) CASCADED TRAJECTORY REFINEMENT

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 215 days.

(21) Appl. No.: 18/145,124

(22) Filed: Dec. 22, 2022

(65) Prior Publication Data

US 2024/0208536 A1 Jun. 27, 2024

(51) Int. Cl.
| | |
|---|---|
| *B60W 60/00* | (2020.01) |
| *B60W 30/09* | (2012.01) |
| *B60W 30/095* | (2012.01) |
| *B60W 50/00* | (2006.01) |

(52) U.S. Cl.
CPC ........ *B60W 60/0011* (2020.02); *B60W 30/09* (2013.01); *B60W 30/0956* (2013.01); *B60W 50/0097* (2013.01); *B60W 2050/0028* (2013.01); *B60W 2554/4041* (2020.02); *B60W 2554/4044* (2020.02); *B60W 2554/4045* (2020.02); *B60W 2556/40* (2020.02)

(58) Field of Classification Search
None
See application file for complete search history.

(56) References Cited

U.S. PATENT DOCUMENTS

| | | | | |
|---|---|---|---|---|
| 2012/0327220 | A1* | 12/2012 | Ma | G06T 7/292 |
| | | | | 348/135 |
| 2018/0129906 | A1* | 5/2018 | Habibian | G06V 10/764 |
| 2020/0298891 | A1* | 9/2020 | Liang | G06N 5/04 |
| 2021/0188308 | A1 | 6/2021 | Zhu et al. | |
| 2021/0188327 | A1* | 6/2021 | Otliga | G01C 21/3407 |
| 2021/0197861 | A1 | 7/2021 | Galoogahi et al. | |
| 2022/0153310 | A1 | 5/2022 | Yang et al. | |
| 2022/0379920 | A1 | 12/2022 | Yang et al. | |
| 2024/0045404 | A1* | 2/2024 | Sinha | G06T 7/20 |

FOREIGN PATENT DOCUMENTS

WO WO2020198121 A1 10/2020

OTHER PUBLICATIONS

PCT Search Report and Written Opinion mailed May 9, 2024 for International Application No. PCT/US2023/085768, 9 pages.

* cited by examiner

*Primary Examiner* — Daniel L Greene
(74) *Attorney, Agent, or Firm* — Lee & Hayes, P.C.

(57) ABSTRACT

Systems and techniques for determining predicted object trajectories are disclosed. A vehicle computing system determines an initial predicted trajectory for an object detected in the environment and determine a predicted location for the object at the endpoint of the trajectory. Using a feature map of the environment, the vehicle computing system refines endpoint location based on a context for the endpoint. The system then determines a middle point of the trajectory based on the refined endpoint location and refines the middle location further based on the context for that location. The system iteratively uses one or more subsequent intermediate points and contexts along the trajectory for further location refinement(s) to generate a refined predicted object trajectory for the object and to determine trajectories for controlling a vehicle.

20 Claims, 6 Drawing Sheets

CASCADED TRAJECTORY REFINEMENT

BACKGROUND

Perception systems and prediction systems utilize sensor data from sensors of a vehicle in order to determine information about objects within an environment, such as the locations, predicted trajectories, and predicted velocities of such objects. This information is then used by planning systems to determine actions for the vehicle to perform while operating in the environment. For instance, the planning systems may determine actions in order to avoid the objects, such as by yielding to the objects, changing lanes to avoid the objects, paths to travel to remain on course to a planned destination, etc. To determine the most efficient and effective actions for a vehicle, a planning system requires accurate predicted trajectories for objects in the environment. However, it may be increasingly challenging to accurately and efficiently determine predicted object trajectories as the number of detected objects in the environment increases.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
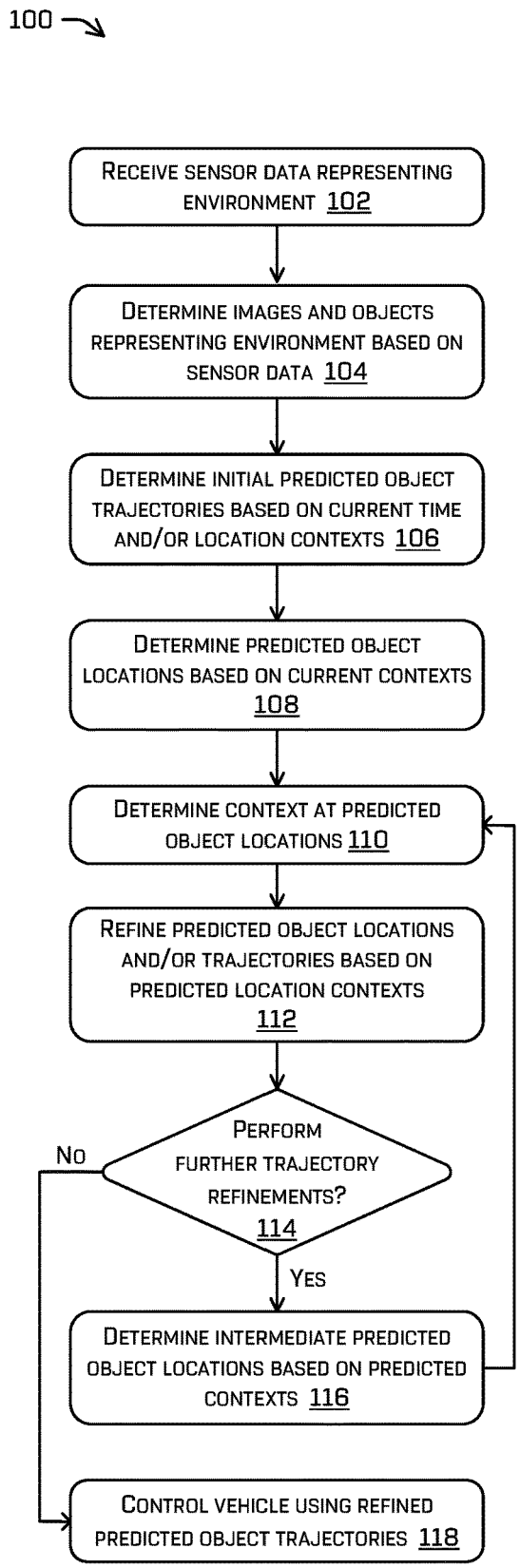
FIG. 1 is a pictorial flow diagram illustrating an example process for determining and refining predicted object trajectories for use in controlling a vehicle, in accordance with examples of the disclosure.
Figure 1:
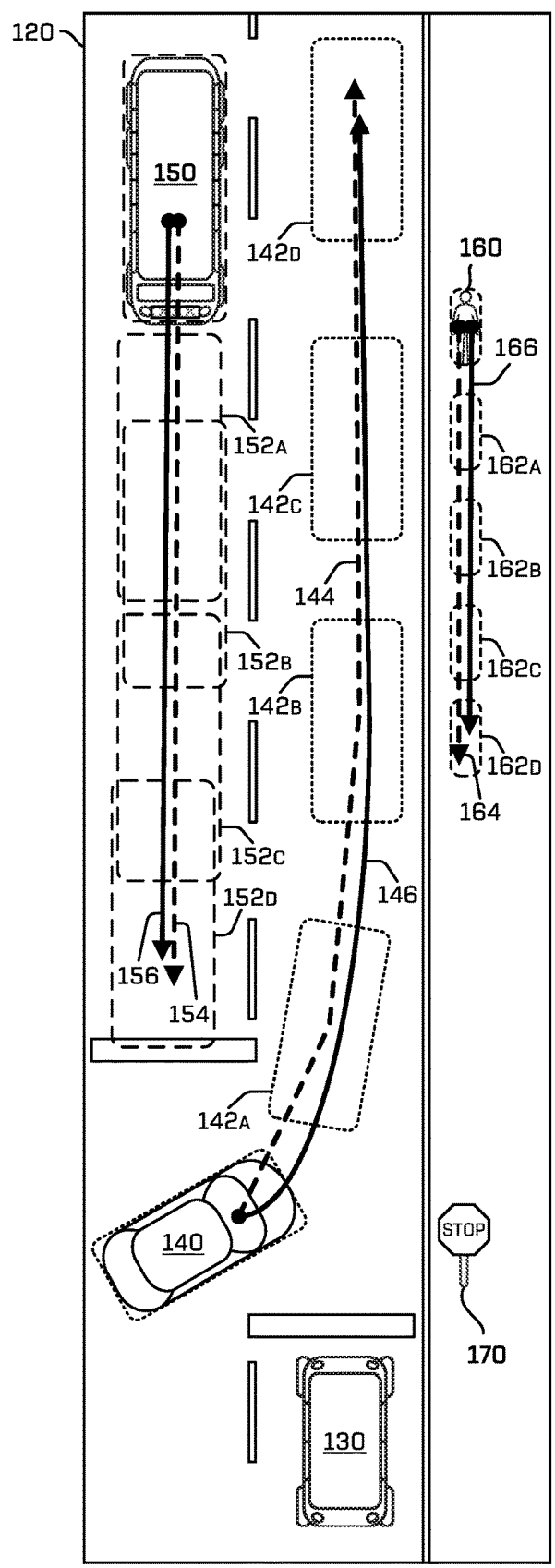

Techniques for determining predicted object behaviors are discussed herein. As described herein, objects in an environment may be detected by a computing system configured at a vehicle, such as an autonomous vehicle, traversing an environment. Such objects may be static (e.g., not in motion) or dynamic (e.g., in motion or capable of being in motion). In examples, a vehicle computing system may determine predicted trajectories for detected dynamic objects. Such trajectories may include predicted paths of travel and prediction locations for an object over a future period of time and/or predicted distance of travel. Such trajectories may also, or instead, include other predicted properties of the object as it travels along a predicted path, such as heading, velocity, acceleration, etc. Predicted object trajectories may be used, for example, to determine one or more vehicle trajectories that may be used or considered for use by the vehicle computing system in controlling the vehicle. For example, a vehicle computing system may determine a predicted trajectory for an object detected in an environment and then determine an operational trajectory that avoids an intersection with the predicted object trajectory.

A vehicle computing system configured at a vehicle traversing an environment may identify or otherwise detect one or more objects within the environment for a current time and/or vehicle location. The vehicle computing system may determine one or more predicted trajectories for these individual objects based on various properties, attributes, and/or classifications of the environment and the objects therein (which may be referred to as "features"). These features may be determined based on sensor data collected by sensors configured at the vehicle. The vehicle computing system may use mapping data and a set of features for a particular vehicle location and/or time that may be referred to as a "context." A context may be subset of features of an environment. A context may include any environmental data, such as a region classification (e.g., drivable region, non-drivable region, construction zone, etc.), static objects and/or associated data (e.g., traffic signs, traffic lights, barriers), road markings (e.g., lane indications), etc. In some examples, a context may not include data associated with dynamic objects (e.g., other vehicles, pedestrian, bicycles, etc.). A context may be represented as a top-down representation of a portion of the environment. Based on a current context for the vehicle, the vehicle computing system may predict a trajectory and one or more locations for a dynamic object detected within the environment. This trajectory may include one or more predicted future locations for the object determined based on the context.

The vehicle computing system may have more accurate information about portions of the environment that are closer (e.g., more proximate) to the location of the vehicle. For example, vehicle sensors may capture more detailed information about objects and features that are closer to the vehicle than objects and features that are farther from the vehicle. The vehicle computing system may use sensor data to identify environmental features and/or objects that it may then use to determine mapping information (e.g., to determine correlations to features included in map data). The determined mapping information for portions of the environment that are closer to the vehicle may be more accurate than the mapping information determined for more distant portions of the environment because the vehicle's sensors may be capable of capturing more accurate data closer to the vehicle. Thus, the accuracy of predicted object locations and trajectories determined by a vehicle computing system may diminish as the predicted distances between the vehicle and the associated objects increase.

In examples, a vehicle computing system may determine a predicted object trajectory using a cascaded object trajectory determination process and/or one or more machine-learned models trained to determine predicted object locations and associated trajectories based on a cascaded object trajectory determination process. A vehicle, such as an autonomous vehicle, operating within an environment may receive sensor data (e.g., captured by sensors of the vehicle or received from remote sensors) associated with the surrounding environment. The sensor data, which may include image data, radar data, lidar data, etc., may be analyzed by the vehicle computing system to detect and classify various static and/or dynamic objects within the operating environment. The vehicle computing system may also, or instead determine various other features of the environment, such as regions (e.g., drivable regions, non-drivable regions, construction zones, etc.), lane markings, etc. The vehicle computing system may aggregate this data into a multi-channel data structure that may represent the features determined in the environment and associated feature data. This data structure may be referred to as a "feature map." In examples, a feature map may take the form of a top-down representation of the environment. For example, such a top-down representation may be a two-dimensional top-down image of pixels, where individual pixels of the image are associated with one or more pieces of data representing various features of the environment determined for the location (e.g., geographical and/or spatial location) represented by the pixel. In other examples, a feature map may take the form of a three-dimensional representation of the environment (e.g., composed of voxels) and/or any other data structure representing the environment and/or one or more features therein.

Using a feature map determined for a current or initial vehicle or object location, the vehicle computing system may determine a context (e.g., a current context), which may be a subset of, and/or associated with, the feature map. For example, a context may include any features of the environment and/or associated mapping data that may be associated with static aspects of the environment (e.g., aspects other than dynamic objects) at a particular location. In other examples, the context may include data associated with dynamic objects detected in the environment. In examples, a context for a particular location in an environment may be based on a "feature vector" or data in a feature map that is associated with a single pixel representing the location. Alternatively or additionally, a context for a particular location in an environment may be based on a feature vector or data in a feature map that is associated with a group of pixels representing the location. In some examples, this group of pixels may be a contiguous group of pixels (e.g., centered around the location) that may be referred to as a "crop" of pixels.

In examples, map data (different from the disclosed feature maps) may be used to determine a vehicle or object location and/or context. Map data may contain static features in an environment and may be used for localization of a vehicle. The map data may have been pre-mapped and stored for use by a vehicle as a reference. The map data may be used to determine a scene, a scene context, and/or a weighting of a type of prediction may be used for a certain context (e.g., between the disclosed cascading prediction and/or prediction models that extend from a current time into the future examples of which are incorporated into this application below).

Using the context at the current or an initial location of the object, the vehicle computing system (e.g., an initial location prediction system, component, or model) may determine an initial ("coarse") predicted location for a particular object detected in the environment. In examples, the vehicle computing system may determine an initial prediction location for the object at a terminal or most distant end of a predicted object trajectory. For example, the vehicle computing system may be configured to determine predicted object trajectories that represent trajectories that the associated objects are predicted to travel during a specific amount of time into the future (e.g., 5 seconds, 8 seconds, 10 seconds, etc.). This amount of time may be referred to as a "trajectory time horizon." The vehicle computing system may be configured to determine a predicted location for the object at the terminal time (or end) of the trajectory time horizon. For example, where the trajectory time horizon is 8 seconds, the vehicle computing system may use its current context to determine a predicted object trajectory of the object and a predicted location for the object at 8 seconds into the future.

Alternatively or additionally, the vehicle computing system may be configured to determine predicted object trajectories representing predicted travel distances for the object (e.g., 10 meters, 100 meters, 500 meters, 1 kilometer, etc.). This distance may be referred to as a "trajectory distance horizon." The vehicle computing system may be configured to determine a predicted location for the object at the terminal end of the trajectory distance horizon. For example, where the trajectory distance horizon is 100 meters, the vehicle computing system may use its current context to determine a predicted object trajectory of the object and a predicted location for the object after the object has traveled 100 meters in the future (e.g., a location of the object at the terminal end of the predicted object trajectory after a distance of object travel). Alternatively or additionally, the trajectory distance horizon may be based on a distance of travel of the vehicle configured with the vehicle computing system. For example, the vehicle computing system may be configured to determine a predicted location for the object after the vehicle has traveled a particular distance. For example, where the trajectory distance horizon is 100 meters, the vehicle computing system may use its current context to determine a predicted object trajectory of the object and a predicted location for the object after the vehicle itself has traveled 100 meters in the future (e.g., a location of the object at the terminal end of the predicted object trajectory after a distance of vehicle travel).

Based on the predicted location of the object at the terminal end of the predicted object trajectory, the vehicle computing system (e.g., a predicted object trajectory refinement system, component, or model) may determine a context at that predicted location. For example, using a feature map and/or other data, the vehicle computing system may determine a pixel or group of pixels in a feature map representing a predicted location of an object at a terminal end of its associated predicted object trajectory and then determine a predicted context at that pixel (e.g., based on a feature vector represented by that pixel). For instance, continuing the examples above, the vehicle computing system may determine a pixel in a feature map representing a predicted location of an object at 8 seconds in the future and determine a predicted context at that pixel. Alternatively or in addition, the vehicle computing system may determine a pixel in a feature map representing a predicted location of an object after the object has traveled 100 meters and determine a predicted context at that pixel.

In examples, attributes of the context determined for the coarse predicted object location of the terminal end may not correspond to attributes determined for the terminal end based on the context of the current location of the object. For example, the vehicle computing system may initially determine, based on mapping data and the context at the current location of the object, that the terminal end of the predicted object trajectory is in a driving lane of a drivable region. However, the determined context at the initially determined location of the terminal end may indicate that the object is not in a drivable region (e.g., on the sidewalk). Therefore, the location of the terminal end of the trajectory may be refined to move the location onto the drivable region, as describe herein.

Based on the context determined for the predicted location of the object at the terminal end of the initially determined predicted object trajectory, the vehicle computing system may refine the predicted location for the object at the terminal end of the predicted trajectory for the object. For example, the vehicle computing system may adjust the path associated with trajectory and/or one or more other trajectory properties and/or characteristics based on the context at the terminal end of the trajectory. In examples, the vehicle computing system may refine the trajectory based on the refining (e.g., adjusting or modifying) of the location of the object at the terminal end of the trajectory (and/or at any other point along the trajectory). Refining the location and/or trajectory may also, or instead, include updating the context for the location of the object at the terminal end of the trajectory based on the refined location of the object at the terminal end.

For example, based on the context determined for a pixel associated with the object location at the terminal end of the trajectory, the vehicle computing system may determine that the object should be predicted to be in a different location. For instance, the vehicle computing system may determine that a predicted object location for a vehicle object at the terminal end of a predicted trajectory may actually be partially on a sidewalk (e.g., due to an inaccurate predicted object location initially determined using the context at the current object location). In this instance, the vehicle computing system may determine a refined location for the object at the terminal end of its predicted object trajectory that places the other vehicle in a roadway. This refined location for the object at the terminal end of its predicted object trajectory may also be associated with a refined terminal end context for that location. The refined terminal end location and/or context may be used to determine a refined predicted object trajectory.

In various examples, trajectory refinement may be based on and/or associated with the kinematic attributes determined for the object and/or the context. For example, the context may provide data indicating the potential movements of the object and/or limitations on such movement (e.g., indicating curbs, walls, lanes, traffic control devices, etc. that may determine how an object may move). Based on this data, a vehicle computing system may determine more accurate predicted motion and/or other attributes for an object (e.g., velocity, acceleration, heading, etc.). This may result in smoother and/or more accurate predicted object trajectories.

Using the refined object location(s) and/or trajectory, the vehicle computing system may next determine a predicted temporally and/or spatially intermediate location for the object (e.g., using linear interpolation and/or object location determination system as described herein). This initial predicted intermediate object location may be referred to as a coarse predicted object location. In examples, the vehicle computing system may determine this predicted intermediate object location as the predicted location of the object at any point between one or more previously determined and/or refined locations along the trajectory ("intermediate" point or location), such as the spatial or temporal center point of the trajectory between the current location of the object and the terminal end of the trajectory. The center (e.g., central, median, etc.) point of a trajectory may be based on the length of time of object motion or travel associated with the trajectory. For example, the vehicle computing system may be configured to determine a predicted object location at half of the time of the trajectory time horizon and/or half of the distance of the trajectory distance horizon (e.g., the predicted object location is equidistant temporally or spatially from the current object location and the terminal end location of the associated trajectory). For instance, if the trajectory time horizon is 8 seconds, the vehicle computing system may determine a predicted location for the object at 4 seconds. In another example, if the trajectory distance horizon is 100 meters, the vehicle computing system may determine a predicted location for the object after the object has traveled 50 meters.

Based on the coarse predicted intermediate location of the object between previously determined object locations, the vehicle computing system (e.g., a predicted object trajectory refinement system, component, or model) may determine a context at that intermediate object location. For example, using a feature map and/or other data, the vehicle computing system may determine a pixel in a feature map representing a predicted intermediate location of an object at a center point of its associated predicted object trajectory and then determine a predicted context at that pixel. For instance, continuing the intermediate object location examples above, the vehicle computing system may determine a pixel in a feature map representing a predicted location of an object at 4 seconds in the future and determine a predicted context at that pixel. Alternatively or in addition, the vehicle computing system may determine a pixel in a feature map representing a predicted location of an object after the object has traveled 50 meters and determine a predicted context at that pixel.

Based on the contexts determined for the predicted intermediate location of the object and the predicted location of the object at the terminal end of the trajectory, the vehicle computing system may refine the location of the predicted intermediate location and/or the predicted trajectory for the object. For example, the vehicle computing system may further adjust the location of the predicted intermediate location, the path associated with trajectory, one or more other trajectory properties and/or characteristics, and/or one or more predicted object locations based on the context at the intermediate location of the trajectory. In examples, any previously refined aspects of the trajectory may be further refined. For example, if the location of the object at the terminal end of the trajectory was adjusted in a previous refinement, the location of the object at the terminal end of the trajectory may be further refined.

Using one or more refined object locations, the vehicle computing system may determine one or more subsequent coarse predicted intermediate locations for the object (e.g., using linear interpolation and/or object location determination system as described herein). In examples, the vehicle computing system may determine these subsequent intermediate locations as the center points of previously determined arclengths or segments of the trajectory. For example, the vehicle computing system may determine a subsequent intermediate location between the current location of the object and the predicted location of the object at the center point of the trajectory (e.g., as represented in the twice-refined trajectory). The vehicle computing system may also, or instead, determine a subsequent intermediate location between the predicted location of the object at the center point of the trajectory (e.g., as represented in the twice-refined trajectory) and the predicted location of the object at the terminal end of the trajectory (e.g., as represented in the twice-refined trajectory). For example, the vehicle computing system may be configured to determine predicted object locations at one-quarter and/or three-quarters of the time of the trajectory time horizon and/or one-quarter and/or three-quarters of the distance of the trajectory distance horizon. For instance, if the trajectory time horizon is 8 seconds, the vehicle computing system may determine predicted locations for the object at 2 seconds and/or 6 seconds. In another example, if the trajectory distance horizon is 100 meters, the vehicle computing system may determine predicted locations for the object after the object has traveled 25 meters and/or 75 meters.

Based on the predicted subsequent intermediate location(s) of the object along the refined predicted object trajectory, the vehicle computing system (e.g., a predicted object trajectory refinement system, component, or model) may determine contexts at those subsequent intermediate locations. For example, using a feature map and/or other data, the vehicle computing system may determine a pixel in a feature map representing a predicted subsequent intermediate location of an object at a point between the current location and the center point of its associated predicted object trajectory and then determine a predicted context at that pixel. For instance, continuing the subsequent intermediate location examples above, the vehicle computing system may determine a pixel in a feature map representing a predicted location of an object at 2 seconds in the future and determine a predicted context at that pixel. The vehicle computing system may also, or instead, determine a pixel in a feature map representing a predicted location of an object at 6 seconds in the future and determine a predicted context at that pixel. Alternatively or in addition, the vehicle computing system may determine a pixel in a feature map representing a predicted location of an object after the vehicle has traveled 25 meters and determine a predicted context at that pixel. The vehicle computing system may also, or instead, determine a pixel in a feature map representing a predicted location of an object after the vehicle has traveled 75 meters and determine a predicted context at that pixel.

Based on the context(s) determined for the predicted subsequent intermediate location(s) of the object and contexts for other locations used in previous refinements (e.g., at the center point and the terminal end), the vehicle computing system may again refine these locations of the object along the predicted trajectory for the object. For example, the vehicle computing system may further adjust the locations of these intermediate points along the path associated with trajectory, one or more other trajectory properties and/or characteristics, and/or one or more predicted object locations based on the context at the intermediate location of the trajectory. Here again, any previously refined aspects of the trajectory may be further refined. For example, if the location of the object at the terminal end of the trajectory was adjusted in a previous refinement, the location of the object at the terminal end of the trajectory may be further refined.

These operations may repeatedly be performed on various segments or arclengths of a predicted object trajectory to further refine the trajectory. For example, using the further refined trajectory, the vehicle computing system may determine one or more other predicted intermediate locations for the object. In examples, these other subsequent intermediate locations may be center points of a previously determined arclength of the trajectory determined by bisecting such previously determined arclengths. For example, the vehicle computing system may determine a subsequent intermediate location between the current location of the object and a predicted location of the object used in a previous refinement. For instance, the vehicle computing system may be configured to determine a predicted object location at one-eighth, three-eighths, five-eighths, and/or seven-eighths of the time of the trajectory time horizon and/or one-eighth, three-eighths, five eighths, and/or seven eighths of the distance of the trajectory distance horizon where the predicted locations at the quarters of trajectory have been used in previous refinements. For instance, if the trajectory time horizon is 8 seconds and previous refinements have been made based on 2, 4, 6, and 8 second segments of the trajectory, the vehicle computing system may determine predicted locations for the object at 1, 3, 5, and/or 7 seconds. Similarly, if the trajectory distance horizon is 100 meters and previous refinements have been made based on 25, 50, 75, and 100 meter arclengths of vehicle travel, the vehicle computing system may determine predicted locations for the object along the predicted object trajectory after the object will have traveled 12.5, 37.5, 62.5, and/or 87.5 meters. The vehicle computing system may determine context(s) at these further intermediate locations and again refine the predicted locations along the trajectory for the object.

In various examples, the determined intermediate points may be any number of points at any location along a (e.g., initial and/or refined) predicted trajectory. For example, initial intermediate points at one third and two thirds of the time and/or distance horizon may be determined (e.g., instead of a single center point). Intermediate points at thirds of the trajectory segments between those initial points may be determined and refined, and so forth. In various examples, one or more of the disclosed components and systems may determine multiple intermediate locations and/or contexts substantially simultaneously (e.g., in parallel) and/or sequentially. The disclosed components and systems may also, or instead, perform refinements (e.g., adjustments of locations and/or contexts) substantially simultaneously (e.g., in parallel) and/or sequentially.

The number and location of determined intermediate points may also, or instead, be determined based on one or more criteria. For example, an object's predicted velocity and/or acceleration may be used to determine a number of intermediate points (and therefore a number of refinement iterations) for a predicted object trajectory. For example, for a slower object, intermediate points associated with smaller segments of the trajectory may be determined, while for a faster object, intermediate points associated with larger segments of the trajectory may be determined. In another example, trajectory curvature may be used to determine a number and/or location of intermediate points. For example, for a relatively straight trajectory, fewer intermediate points (and therefore fewer refinement iterations) may be determined because refinements are less likely to adjust the locations of such points, while for a trajectory with significant curvature, more intermediate points (and therefore more refinement iterations) may be determined because refinements are more likely to adjust the locations of such points due to the changing directions associated with the trajectory. In another example, an object classification may be used to determine a number and location of intermediate points. For example, a vehicle may have fewer intermediate points because its trajectory is less likely to change within a short distance while a pedestrian may have more because a pedestrian is more likely to change direction of movement is short distances.

A predicted object trajectory may be further segmented and locations further refined a predetermined number of times and/or until one or more conditions have been met. In examples, a vehicle computing system may be configured to refine an object trajectory locations based on a particular length of time or distance associated with trajectory segments or arclengths. For example, the system may be configured to iteratively refine a trajectory until the trajectory has been refined using 1-second segments of the trajectory or arclengths of the trajectory based on 12.5 meter distances of vehicle travel.

Alternatively or additionally, one or more thresholds or conditions may be evaluated at individual iterations of the cascaded object trajectory determination process to determine whether to execute another iteration of the process. For example, a threshold number of iterations may be determined based on an object's associated velocity, acceleration, and/or path curvature (e.g. may perform more iterations for a path with greater curvature, may perform fewer iterations for a slower object, etc.). A threshold number of iterations may also, or instead, be determined based on an object's classification (e.g. slower object types may be associated with a higher number of iterations and vice versa).

The cascaded object trajectory determination techniques and systems described herein may be implemented in a prediction component or system of a vehicle computing system. The resulting refined object trajectories may be provided to a planning component or system of the vehicle computing system for use in determining candidate and/or operation trajectories for the vehicle. In various examples, the disclosed cascaded object trajectory determination techniques and systems may also, or instead, be similarly used to determine one or more predicted trajectories for the vehicle itself. In such examples, these cascaded object trajectory determination techniques and systems may be implemented in the planning component or system of the vehicle computing system.

One or more other components or systems of a vehicle computing system may determine predicted object trajectories. In some cases, such systems may determine predicted trajectories for one or more objects for which the disclosed cascaded object trajectory determination system has also determined predicted trajectories. In such examples, these predicted object trajectories may be provided to a planning component or system that may be configured to use such trajectories in determining candidate and/or operation trajectories for the vehicle. Examples of techniques for predicting trajectories for objects in an environment can be found, for example, in U.S. Pat. No. 11,169,531, issued Nov. 9, 2021, and titled "Trajectory Prediction on Top-Down Scenes," the contents of which is herein incorporated by reference in its entirety and for all purposes. Examples of techniques for using predicting object trajectories to determine an operational trajectory for a vehicle can be found, for example, in U.S. patent application Ser. No. 17/681,461, filed Feb. 2, 2022, and titled "Generating Predictions based on Object Type," the contents of which is herein incorporated by reference in its entirety and for all purposes.

In examples, the above incorporated techniques for determining predictions may be used by a vehicle concurrently with the disclosed techniques. For example, a different prediction may be provided by each technique (that may have an associated confidence value). A planning component of a vehicle can use predictions from the concurrent techniques and determine which is most appropriate for a given situation. In some examples, context information may be used from an environment to determine which prediction may be most appropriate for the context. For example, a vehicle approaching an intersection may rely more upon the disclosed techniques rather than those incorporated above. As disclosed herein, scene context may be determined using map data for an environment. In examples, predictions using multiple techniques may all be used concurrently by a prediction component as opposed to selecting from between them.

In various examples, the cascaded object trajectory determination processes and systems may be implemented as two or more cascaded machine-learned models. For example, an initial location determination machine-learned model may be trained to use feature map, context, and/or trajectory data associated with an object to generate output representing a predicted location for the object at a terminal end of a predicted object trajectory determined based on a context for the object at its current location. The object location prediction machine-learned model may provide this output representing a predicted location and an associated context for that location as input to a trajectory refinement model. A trajectory refinement model may be trained to refine a locations of the object along its trajectory and/or associated contexts associated with those locations based on at least a current location and/or context of the object, one or more predicted locations of the object, and the contexts at the predicted location. The trajectory refinement model may then output a refined predicted object location and/or refined contexts for one or more locations along such a trajectory. This refined location and/or context information output of the trajectory refinement model may then be provided to a location determination component that may be configured to determine (e.g., using linear interpolation and/or by executing a model) one or more coarse intermediate locations based on refined and current locations for the object. The determined intermediate location(s) may be provided as input to the trajectory refinement model for additional refinements of those and/or other locations and contexts along the trajectory. This process may be iteratively performed by the location determination component and the trajectory refinement model for a configured number or iterations and/or until one or more criteria or thresholds are met. In examples, the disclosed techniques and systems may also, or instead, be implemented by any combination of one or more machine-learned models and associated components that perform one or more of the operations described herein.

The systems and techniques described herein may be directed to leveraging trajectory data, feature data, context data, object detection data, and/or other data to enable a vehicle, such as an autonomous vehicle, to more accurately and efficiently determine predicted object trajectories for objects within an environment in which the vehicle may be operating. Using these improved predicted object trajectories may in turn enable the vehicle to more efficiently and accurately determine an operational trajectory for controlling the vehicle through the environment. This more accurate operational trajectory may improve vehicle control and operational safety, facilitating safer navigation through an environment and increased efficiency in utilizing vehicle resources. In particular examples, the systems and techniques described herein can utilize data structures (e.g., multichannel data structures such as a top-down image of pixels representing feature data) containing data representing a region of an environment, predicted trajectories of objects in the environment, object locations and/or positions, features of the environment, etc.

By using the cascaded object trajectory determination techniques described herein to more accurately determine predicted trajectories for dynamic objects detected in an environment, the examples described herein may facilitate the determination of safer and more accurate operational vehicle trajectories, resulting in increased safety and accuracy of vehicle control. The disclosed systems and techniques are especially advantageous to vehicle operations proximate to objects in an environment, allowing an autonomous vehicle to more safely operate in the environment. For example, the techniques described herein may be faster and/or more robust than conventional techniques, as they may increase the ability of an autonomous vehicle to identify and predict the movements of objects in an environment, and therefore improve the ability of an autonomous vehicle safely navigate in an environment and more smoothly implement vehicle control operations, which may, in turn, provide more comfortable rider experiences. That is, techniques described herein provide a technological improvement over existing object detection and vehicle trajectory determination technology.

The techniques described herein may also improve the operation of computing systems and increase resource utilization efficiency. For example, computing systems, such as vehicle computing systems, may more efficiently perform object trajectory predictions using the techniques described herein because the disclosed examples may reduce the amount of data needed to represent various predicted object trajectories by increasing the quality of predicted object trajectories provided to a vehicle operational trajectory planning component or system, thereby reducing or eliminating the need to more frequently generate and use a higher quantity of potentially lower quality predicted object trajectories to determine vehicle trajectories. The disclosed examples may also reduce the amount of data needed to represent various types of data used to represent trajectories and reduce the amount of processing required to determine trajectories by determining more accurate predicted object trajectories less often. Because the disclosed refined predicted object trajectories are more accurate, the need to generate predicted object trajectories more frequently (e.g., based on updated environment and context data) may be reduced. Therefore, fewer resources may be expended in generating and processing such trajectories. Therefore, the refined predicted object trajectories determined as described herein may require fewer data storage resources and less processing to determine such trajectories and determine an operational trajectory than would be required using conventional techniques where predicted object trajectories may be more frequently determined with lower accuracy.

The systems and techniques described herein can be implemented in a number of ways. Example implementations are provided below with reference to the following figures. Although the disclosed techniques may be discussed in the context of an autonomous vehicle, the techniques described herein can be applied to a variety of systems (e.g., a semi-autonomous vehicle, a manually operated vehicle, a sensor system, a robotic platform, etc.) and are not limited to autonomous vehicles. In another example, the techniques can be utilized in an aviation or nautical context, or in any system involving vehicle or object trajectories and/or deceleration control and/or implementation point determination operations. Further, although aspects of the disclosed systems and techniques may be discussed in the context of originating with particular types of sensor data and processing with particular types of components, data and data structures as described herein can include any two-dimensional, three-dimensional, or multidimensional data and data associated with any types of sensors (e.g., cameras, lidar, radar, sonar, time-of-flight, and the like). Additionally, the systems and techniques described herein can be used with real data (e.g., captured using sensor(s)), simulated data (e.g., generated by a simulator, training data, and the like) or any combination of thereof.

FIG. 1 is a pictorial flow diagram of an example process 100 for determining a predicted object trajectory for use in controlling a vehicle. In examples, one or more operations of the process 100 may be implemented by a vehicle computing system, such as by using one or more of the components and systems illustrated in FIGS. 2, 3, and 4 and described below. For example, one or more components and systems can include those associated with the cascaded object trajectory determination system 210 illustrated in FIG. 2, the vehicle computing system 322 illustrated in FIG. 3 and/or the vehicle computing device(s) 404, processors 416 and/or 440, memories 418 and/or 442, planning component 424, prediction component 430, and/or cascaded object trajectory determination component 432 illustrated in FIG. 4. In examples, the one or more operations of the process 100 may be performed by a remote system in communication with a vehicle, such as planning component 448, prediction component 444, and/or cascaded object trajectory determination component 446 illustrated in FIG. 4. In still other examples, the one or more operations of the process 100 may be performed by a combination of a remote system and a vehicle computing system. However, the process 100 is not limited to being performed by such components and systems, and the components.

At operation 102, a vehicle computing system may receive sensor data representing an environment. For example, a vehicle, such as an autonomous vehicle, operating within an environment and associated with the vehicle computing system may be configured with sensors that may capture sensor data in the environment. Alternatively or additionally, the vehicle computing system may receive sensor data received from one or more remote sensors. The sensor data may be captured by and/or otherwise associated with one or more sensors of any type, such as cameras, sonar sensors, lidar sensors, radar sensors, time-of-flight sensors, etc.

At operation 104, the vehicle computing may analyze and/or process the sensor data received at operation 102 to detect and classify various static and/or dynamic objects within the operating environment. Further at 102, the vehicle computing system may determine various features and other aspects of the environment and may generate a data structure representing such features. For example, the vehicle computing system may generate one or more feature maps at operation 104. Such feature maps may be in the form of a two-dimensional top-down image data structure. Individual pixels in the top-down image may represent data associated with a corresponding portion of the environment represented by the individual pixels.

An example 120 will be referred to throughout the description of the process 100. The example 120 may represent a portion of an environment in which a vehicle 130 may be operating. The vehicle 130 may be configured with one or more sensors and a vehicle computing system. This vehicle computing system may be configured to identify objects and determine associate predicted trajectories as described herein. The vehicle computing system of vehicle 130 may include one or more components, systems, and/or machine-learned models that may be configured to perform one or more of the cascaded object trajectory determination operations described herein. The vehicle 130 (e.g., the vehicle computing system of the vehicle 130) may detect objects within the environment based on sensor data. For example, the vehicle 130 may detect another vehicle 140, a bus 150, a pedestrian 160, and a stop sign 170 in the environment of the example 120.

At operation 106, the vehicle computing system may determine initial predicted object trajectories for objects detected in the environment based on a current context. This current context may be determined based on the feature map determined based on sensor data that has been (e.g., most recently) collected and/or obtained by the vehicle. The current context may be associated with the vehicle at the current (e.g., most recent) vehicle location. For example, the current context may be based on one or more pixels in a feature map that represent and/or are associated with the current vehicle location in the environment. An initial predicted object trajectory may include one or more predicted locations, actions, properties, and/or attributes of the object associated with the initial predicted object trajectory.

For example, an initial predicted object trajectory may include an indication of one or more object locations at the terminal end of the trajectory. Alternatively or additionally, an initial predicted object trajectory may include data that may be used to determine one or more object locations at the terminal end of the trajectory (e.g., in conjunction with feature map and/or context data). As described herein, object trajectories may be predicted for an amount of time (trajectory time horizon) and/or a distance of vehicle travel (trajectory distance horizon) in the future. The terminal end of such a trajectory may be the location at which the associated object is predicted to be located at the end of the applicable horizon. At operation 108, the vehicle computing system may determine one or more object locations at the terminal end of the associated predicted object trajectories. In various examples, a single predicted location for an object at the terminal end of a trajectory may be determined for an individual predicted object trajectory based on the context of the current location of the object. Alternatively or additionally, multiple potential locations at the terminal end of a predicted object trajectory may be predicted for the associated object. In various examples, this operation may be performed by one or more initial location determination machine-learned models trained to determine predicted object trajectories, predicted object locations, and/or one or more other operations as described herein.

Referring again to example 120, the vehicle 130 (e.g., the vehicle computing system of the vehicle 130) may determine a predicted object trajectory 144 for the vehicle 140. Based on the predicted object trajectory 144, the vehicle 130 may determine a predicted location 142d for the vehicle 140 at the terminal end of the predicted object trajectory 144. The vehicle 130 may also determine a predicted object trajectory 154 for the bus 150 and, based on this predicted object trajectory 154, a predicted location 152d for the bus 150 at the terminal end of the predicted object trajectory 154. Similarly, the vehicle 130 may determine a predicted object trajectory 164 for the pedestrian 160 and, based on this predicted object trajectory 164, a predicted location 162d for the pedestrian 160 at the terminal end of the predicted object trajectory 164.

At operation 110, the vehicle computing system may determine a context for the predicted terminal locations along the predicted object trajectories for the objects detected in the environment. These terminal end location contexts may be determined based on the feature map used to determine the initial predicted object trajectories. For example, a terminal end context may be based on one or more pixels in a feature map that represent and/or are associated with the predicted location of an object in the environment at the terminal end of its associated predicted object trajectory. The one or more pixels representing the terminal end location for the object may include one or more features, properties, and/or attributes of the environment at that location. In various examples, one or more aspects of the contexts determined for the terminal end locations may be adjusted or otherwise manipulated based on predicted object behavior. In various examples, this operation may also be performed by one or more predicted object trajectory refinement machine-learned models trained to determine refined predicted object locations and/or contexts and/or one or more other operations as described herein.

Referring again to example 120, the vehicle 130 (e.g., the vehicle computing system of the vehicle 130) may determine a context for the predicted location 142d for the vehicle 140 at the terminal end of the predicted object trajectory 144. The vehicle 130 may also determine a context for the predicted location 152d for the bus 150 at the terminal end of the predicted object trajectory 154. The vehicle 130 may also determine a context for the predicted location 162d for the pedestrian 160 at the terminal end of the predicted object trajectory 164. For example, the vehicle 130 may determine the regions or types of regions in which such objects are predicted to be located, static objects that may be proximate to such objects, etc. at the predicted terminal end locations.

At operation 112, based on the context determined for the predicted locations of the objects at the terminal ends of their associated predicted object trajectories, the vehicle computing system may refine these locations. In performing these refinements, for example, the vehicle computing system may adjust the location of the object at the terminal end of the trajectory. The vehicle computing system may also, or instead, adjust the path associated with trajectory, one or more other trajectory properties and/or characteristics, a position of the object (e.g., at any other point along the trajectory), etc. based on the context at the terminal end of the trajectory. The vehicle computing system may also refine the context at the terminal end of the trajectory and further refine any previously determined contexts for any previously predicted object locations associated with the predicted object trajectory. In various examples, this operation may be performed by one or more trajectory refinement machine-learned models trained to perform such refinement operations based on contexts associated with predicted positions of objects. Such models may receive, as input, output from one or more initial location determination machine-learned models as described herein that may include one or more predicted object locations and/or one or more contexts for one or more predicted object locations.

Referring again to example 120, the vehicle 130 (e.g., the vehicle computing system of the vehicle 130) may refine the predicted object locations for the object trajectory 144 associated with the vehicle 140 based on the context determined for the predicted location 142d for the vehicle 140 at the terminal end of the predicted object trajectory 144. The vehicle 130 may also refine the predicted object locations for the object trajectory 154 associated with the bus 150 based on the context determined for the predicted location 152d for the bus 150 at the terminal end of the predicted object trajectory 154. The vehicle 130 may also refine the predicted object locations for the object trajectory 164 associated with the pedestrian 160 based on the context determined for the predicted location 162d for the pedestrian 160 at the terminal end of the predicted object trajectory 164.

At operation 114, the vehicle computing system may determine whether to perform additional refinements on the predicted object trajectories thus far refined for objects detected in the environment. For example, a cascaded object trajectory determination system (e.g., as configured at a vehicle computing system) may be configured to perform a particular number of trajectory refinements (e.g., 1, 2, 3, 4, 6, 8, etc.) or to perform refinements until a predicted object trajectory has been refined at a particular level of granularity. For example, a cascaded object trajectory determination system may be configured to segment and refine a trajectory until the trajectory has been refined based on a particular percentage of a trajectory time or distance horizon. For instance, refinements may be performed until segments associated with an eighth of a trajectory time or distance horizon (e.g., 1-second of an 8-second time horizon, 12.5 meters of a 100-meter distance horizon, etc.) have been used to refine the trajectory. In another example, a cascaded object trajectory determination system may be configured to segment and refine a trajectory until the trajectory has been refined based on a particular amount of time or distance. For instance, refinements may be performed until segments associated with one second or 12.5 meters have been used to refine the trajectory. Alternatively or additionally, one or more thresholds or conditions may be evaluated at individual iterations of the cascaded object trajectory determination process to determine whether to execute another iteration of the process.

If the vehicle computing system determines at operation 114 to perform one or more additional trajectory refinements, at operation 116 the vehicle computing system may determine a coarse intermediate predicted object location based on the contexts determined thus far and associated with the refined predicted object trajectory. In examples, the vehicle computing system may bisect the segments of the refined predicted object trajectory based on predicted locations and contexts determined thus far. For instance, if this is the first iteration of the process 100 and the locations for which context was determined for refinements thus far include only the current object location and the predicted object terminal end location, the vehicle computing system may determine a center point between the current object location and the predicted object terminal end location. In another example, if a central point of the trajectory has already been used to determine a context for that location and refine the trajectory, at operation 116 contexts for subsequent locations at the center of the trajectory segments between the central point and the current object location and between the central point and the terminal end location may be used to further refine the trajectory, and so forth. In various examples, this operation may be performed by a location determination system or component as described herein that may perform a linear interpolation to determine such locations and/or that may be a machine-learned model configured to determine such locations as described herein.

Referring again to example 120, the vehicle 130 (e.g., the vehicle computing system of the vehicle 130) may determine an intermediate predicted object location 142b along the predicted object trajectory 144 associated with the vehicle 140 based on the predicted location 142d and/or the refined predicted object trajectory 144. The vehicle 130 may also determine an intermediate predicted object location 152b along the predicted object trajectory 154 associated with the bus 150 based on the predicted location 152d and/or the refined predicted object trajectory 154. The vehicle 130 may further determine an intermediate predicted object location 162b along the predicted object trajectory 164 associated with the pedestrian 160 based on the predicted location 162d and/or the refined predicted object trajectory 164.

The process 100 may return to the operation 110, where the vehicle computing system may determine a context for the coarse predicted intermediate locations along the predicted object trajectories determined at operation 116 for the objects detected in the environment. These predicted intermediate location contexts may be determined based on the feature map used to determine and refine predicted object trajectories. For example, an intermediate location context may be based on one or more pixels in a feature map that represent and/or are associated with the predicted location of an object in the environment at the determined intermediate location of its associated predicted object trajectory. The one or more pixels representing the intermediate location for the object may include one or more features, properties, and/or attributes of the environment at that location. In various examples, one or more aspects of the contexts determined for the intermediate locations may be adjusted or otherwise manipulated based on predicted object behavior. In various examples, this operation may also be performed again by the trajectory refinement machine-learned models trained to determine refine object locations, contexts, and/or perform one or more other operations as described herein.

Referring again to example 120, the vehicle 130 (e.g., the vehicle computing system of the vehicle 130) may determine a context for the predicted intermediate location 142b of the predicted object trajectory 144 for the vehicle 140. The vehicle 130 may also determine a context for the predicted intermediate location 152b of the predicted object trajectory 154 for the bus 150. The vehicle 130 may also determine a context for the predicted intermediate location 162b of the predicted object trajectory 164 for the pedestrian 160.

Returning again to operation 112, based on the context determined for the coarse predicted intermediate locations of the objects along their associated predicted object trajectories, the vehicle computing system may further refine the predicted locations for such objects. As noted, refinements may also include, for example, adjusting one or more of the path associated with trajectory, one or more other trajectory properties and/or characteristics, a position of the object (e.g., at the terminal end of the trajectory, at any intermediation location, and/or at any other point along the trajectory), any predicted location of the object (e.g., any previously determined and/or refined location), an orientation of the object, a heading of the object, a velocity of the object, an acceleration of the object, etc. based on the contexts associated with the intermediate predicted locations. The vehicle computing system may further refine any previously determined contexts for any previously predicted object locations associated with the predicted object trajectory. For example, the vehicle computing system may refine the context determined for the terminal end location of a predicted object trajectory based on the contexts associated with the intermediate predicted locations. This may include adjusting the location of that point and/or any other contextual attributes associated with that terminal end location and/or any pixels associated therewith. Here again, this operation may be performed by one or more trajectory refinement machine-learned models trained to perform such refinement operations based on contexts associated with predicted positions of objects. Such models may receive, as input, output from one or more location determination components or systems as described herein.

Referring again to example 120, the vehicle 130 (e.g., the vehicle computing system of the vehicle 130) may refine the predicted object locations for the object trajectory 144 associated with the vehicle 140 based on the context determined for the intermediate location 142b and the refined context determined for the predicted location 142d for the vehicle 140 at the terminal end of the predicted object trajectory 144. The vehicle 130 may also refine the predicted object locations for the object trajectory 154 associated with the bus 150 based on the context determined for the intermediate location 152b and the refined context determined for the predicted location 152d for the bus 150 at the terminal end of the predicted object trajectory 154. The vehicle 130 may also refine the predicted object locations for the object trajectory 164 associated with the pedestrian 160 based on the context determined for the intermediate location 162b and the refined context determined for the predicted location 162d for the pedestrian 160 at the terminal end of the predicted object trajectory 164.

At operation 114, the vehicle computing system may determine whether further iterations of one or more of the operations of the process 100 are to be performed. If so, the process 100 may return to operation 116 to determine one or more subsequent intermediate locations along predicted object trajectories and then to operations 110, etc. to preform further trajectory refinements.

If, at operation 114, the vehicle computing system determines that a threshold number of trajectory refinements have been performed and/or the threshold trajectory refinement criteria have been met, at operation 118 the vehicle computing system may use the refined predicted object locations to determine refined predicted object trajectories that may be used to control the vehicle. For example, the vehicle computing system may provide the refined trajectories to a planning component or system for use in determining candidate vehicle trajectories and/or one or more operational vehicle trajectories.

Referring again to example 120, the vehicle 130 (e.g., the vehicle computing system of the vehicle 130) may determine intermediate locations 142a and 142c for the vehicle 140 based on the refined object locations for the trajectory 144 and/or the contexts associated with terminal end location 142d and the intermediate location 142b. The vehicle 130 may then determine contexts for the intermediate locations 142a and 142c. The vehicle 130 may use the contexts for the intermediate locations 142a and 142c to refine the object locations for the trajectory 144 and/or any associated contexts (e.g., the contexts previously determined for the terminal end location 142d and the intermediate location 142b). In this example, the use of the contexts associated with the intermediate locations 142a and 142c may be the final refinement to be performed for this trajectory. Therefore, a final refined trajectory 146 may be determined based on these location refinements. As can be seen in this example, the final refined example trajectory may be smoother because it may be based on more accurate context information and realistic object motion estimations and data and therefore may represent a more accurate prediction of actual object movement within the environment.

Continuing with example 120, the vehicle 130 may determine intermediate locations 152a and 152c for the bus 150 based on the refined object locations for the trajectory 154 and/or the contexts associated with terminal end location 152d and the intermediate location 152b. The bus 150 may then determine contexts for the intermediate locations 152a and 152c. The bus 150 may use the contexts for the intermediate locations 152a and 152c to refine the object locations for the trajectory 154 and/or any associated contexts (e.g., the contexts previously determined for the terminal end location 152d and the intermediate location 152b). In this example, the use of the contexts associated with the intermediate locations 152a and 152c may be the final refinement to be performed for locations associated with this trajectory. The final refined trajectory 156 for the bus 150 may be determined based on these location refinements and used to control the vehicle 130.

Continuing again with example 120, the vehicle 130 may determine intermediate locations 162a and 162c for the pedestrian 160 based on the refined object locations for the trajectory 164 and/or the contexts associated with terminal end location 162d and the intermediate location 162b. The pedestrian 160 may then determine contexts for the intermediate locations 162a and 162c. The pedestrian 160 may use the contexts for the intermediate locations 162a and 162c to refine the object locations for the trajectory 164 and/or any associated contexts (e.g., the contexts previously determined for the terminal end location 162d and the intermediate location 162b). In this example, the use of the contexts associated with the intermediate locations 162a and 162c may be the final refinement to be performed for locations associated with this trajectory. The final refined trajectory 166 for the pedestrian 160 may be determined based on these location refinements and used to control the vehicle.

FIGS. 2A-F are pictorial flow diagrams of an example process 200 for determining a predicted object trajectory for use in controlling a vehicle. In examples, one or more operations of the process 200 may be implemented by a vehicle computing system, such as by using one or more of the components and systems illustrated in FIGS. 3 and 4 and described below. For example, one or more components and systems can include those associated with vehicle computing system 322 illustrated in FIG. 3 and/or vehicle computing device(s) 404, processors 416 and/or 440, memories 418 and/or 442, planning component 424, prediction component 430, and/or cascaded object trajectory determination component 432 illustrated in FIG. 4. In examples, the one or more operations of the process 200 may be performed by a remote system in communication with a vehicle, such as planning component 448, prediction component 444, and/or cascaded object trajectory determination component 446 illustrated in FIG. 4. In still other examples, the one or more operations of the process 200 may be performed by a combination of a remote system and a vehicle computing system. However, the process 200 is not limited to being performed by such components and systems, and the components.

Figure 2A:
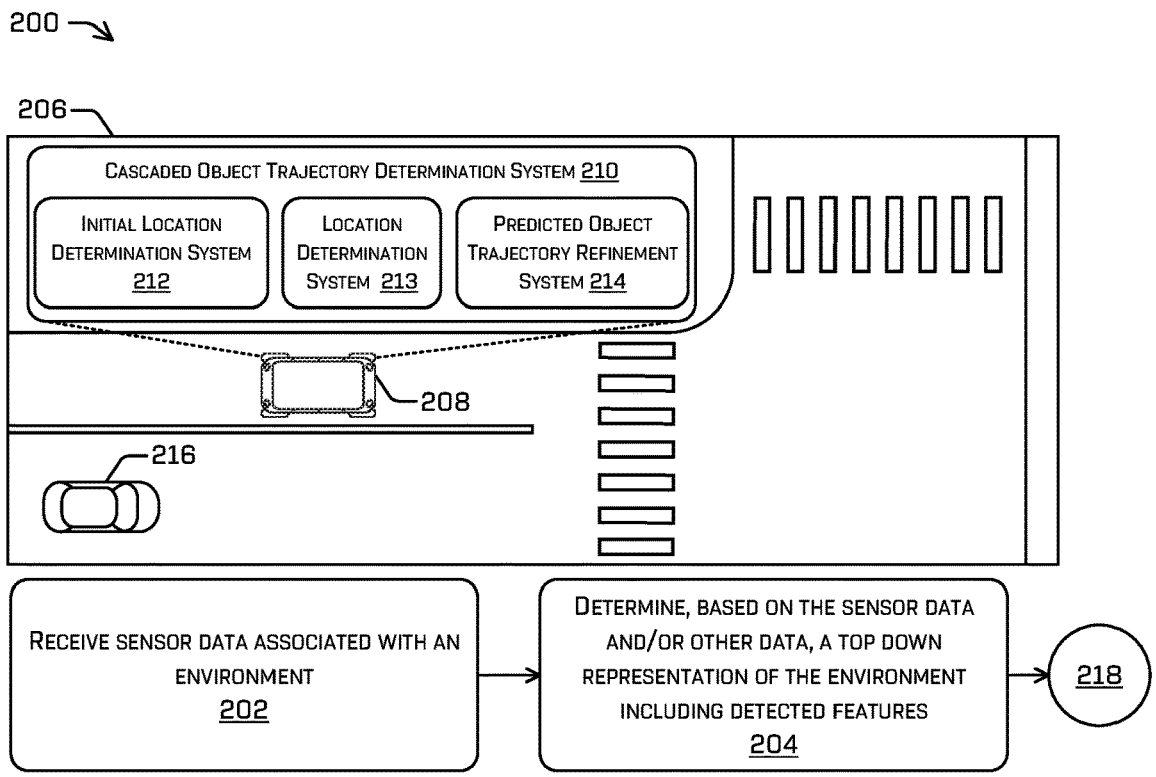
FIGS. 2A-F are pictorial flow diagrams and example environments illustrating an example process for determining and refining predicted object trajectories for use in controlling a vehicle, in accordance with examples of the disclosure.

Referring now to FIG. 2A, at operation 202, a vehicle computing system may receive sensor data representing an environment. For example, a vehicle, such as an autonomous vehicle, operating within an environment and associated with the vehicle computing system may be configured with sensors that may capture sensor data in the environment. Alternatively or additionally, the vehicle computing system may receive sensor data received from one or more remote sensors. The sensor data may be captured by and/or otherwise associated with one or more sensors of any type, such as cameras, sonar sensors, lidar sensors, radar sensors, time-of-flight sensors, etc.

At operation 204, the vehicle computing may determine, based on the sensor data received at operation 202, a top-down representation of the environment that may include various features determined from the sensor data and/or map data (e.g., a feature map). The process 200 may proceed to operation 218 described in regard to FIG. 2B below.

An example 206 illustrates an exemplary portion of an environment in which a vehicle 208 may be traveling. The vehicle 208 may be configured with a vehicle computing system that may include a cascaded object trajectory determination system 210. The cascaded object trajectory determination system 210 may include an initial location determination system 212 that may be configured to determine initial predicted locations and contexts for such locations (e.g., a machine-learned model trained to perform such determinations). The cascaded object trajectory determination system 210 may also include a location determination system 213 that may be configured to determine intermediate locations based on two or more locations, for example, using linear interpolation. The cascaded object trajectory determination system 210 may also include prediction object trajectory refinement system 214 that may be configured to refine predicted object locations and/or previously determined contexts associated therewith based on received locations and/or contexts (e.g., prediction object trajectory refinement system 214 may be a machine-learned model trained to perform such determinations). The environment of example 206 may further include another vehicle 216 that may be a dynamic object in the environment. The vehicle 208 may detect the objects and features in the environment and determine a top-down representation of such objects and features as a feature map. For example, the vehicle 208 may determine a classification for the vehicle 216 and one or more other object attributes, as well as other features of the environment, and generate a feature map having pixels representing such data.

Figure 2B:
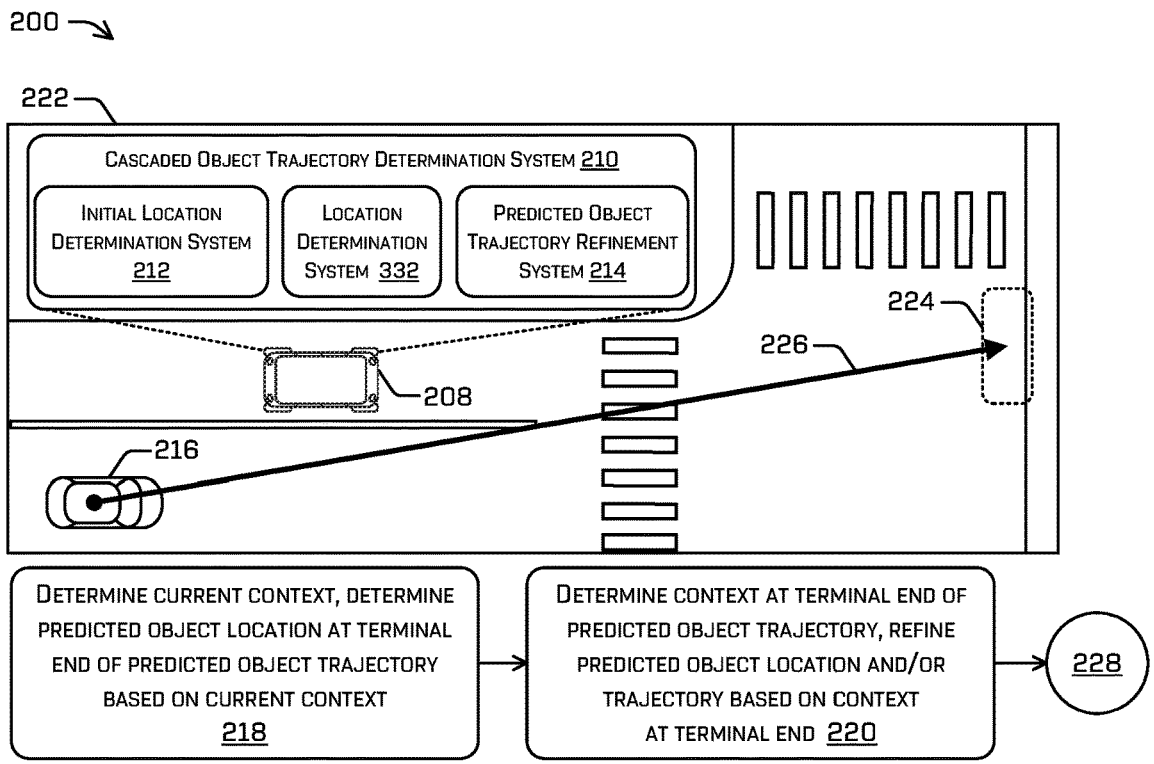

Referring now to FIG. 2B, at operation 218 the vehicle computing system may determine a current context for the vehicle and/or for the location of an object in the environment. For example, the vehicle computing system may determine a context for a current location of an object detected in the environment based on data associated with one or more pixels in a feature map that may represent that current location in the environment. Further at operation 218, using this current context, the vehicle computing system may determine an initial predicted object trajectory for the object and/or a predicted location of the object at the terminal end of the initial predicted object trajectory.

At operation 220, the vehicle computing system may determine a context at the predicted location of the object at the terminal end of the initial predicted object trajectory. The vehicle computing system may use this context to perform (e.g., a first) refinement of the initial predicted object trajectory by adjusting the location of the predicted location of the object at the terminal end of the initial predicted object trajectory based on the determined context for that location. The process 200 may proceed to operation 228 described in regard to FIG. 2C below.

An example 222 illustrates the exemplary portion of an environment in which a vehicle 208 may be traveling introduced in example 206. The vehicle 208 (e.g., the initial location determination system 212 of the cascaded object trajectory determination system 210 configured at the vehicle 208) may determine a predicted object location 224 for the vehicle 208 at the terminal end of the vehicle 216's initial predicted object trajectory 226 based on a current context. The vehicle 208 (e.g., the predicted object trajectory refinement system 214 of the cascaded object trajectory determination system 210 configured at the vehicle 208) may refine the trajectory 226 as described herein based on the context determined for the location 224. For example, as seen in this example, the predicted object location 224 may place the vehicle 216 partially off the drivable roadway. A refinement of the location of the vehicle 216 at the terminal end of trajectory 226 may include adjusting the location of the predicted object location 224 at the terminal end of the trajectory 226 to a location such that the vehicle 216 is predicted to be (e.g., entirely) within a drivable region of the environment.

Figure 2C:
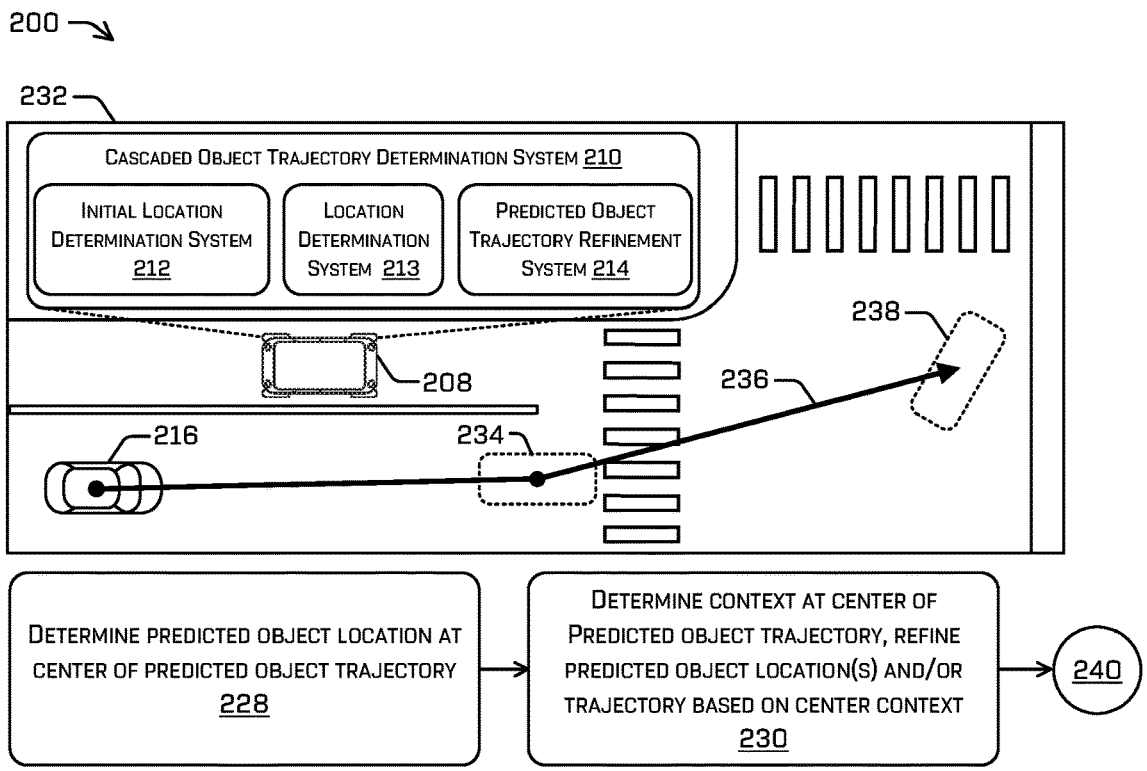

Referring now to FIG. 2C, at operation 228 the vehicle computing system may determine a predicted location of an object in the environment at a center of the predicted object trajectory for that object based on the refined predicted object location at the terminal end of the trajectory determined at operation 220 and/or one or more contexts associated therewith. For example, using the refined location and context determined for the terminal endpoint of the predicted object trajectory that may have been determined at operation 220 along with the (e.g., also refined) context determined for the current object location, the vehicle computing system may determine a predicted central location for the object between those locations with respect to the predicted object trajectory (e.g., central based on a trajectory time horizon and/or a trajectory distance horizon).

At operation 230, the vehicle computing system may determine a context at the predicted location of the object at the center of the (e.g., once) refined predicted object trajectory. The vehicle computing system may use this context to perform refinement of that location. This refinement may also include any of the refinement operations described herein, including adjusting the predicted location of the object at the terminal end of the refined predicted object trajectory and/or adjusting the predicted central location of the object on the refined predicted object trajectory based on the determined context for the predicted central location. The process 200 may proceed to operation 240 described in regard to FIG. 2D below.

An example 232 illustrates the exemplary portion of an environment in which a vehicle 208 may be traveling discussed in the previous examples. The refined predicted object trajectory 236 may represent a refinement of the initial predicted object trajectory 226 described in regard to the example 222. In particular, as shown in this example, the object location 238 at the terminal end of the refined predicted object trajectory 236 is changed from that associated with the initial trajectory such that no part of the predicted location of the vehicle 216 is off of a drivable region.

The vehicle 208 (e.g., the location determination system 213 of the cascaded object trajectory determination system 210 configured at the vehicle 208) may determine a predicted object location 234 for the vehicle 216 between the terminal end predicted object location 238 and the current location of the vehicle 216. The vehicle 208 (e.g., the predicted object trajectory system 214 of the cascaded object trajectory determination system 210 configured at the vehicle 208) may further determine a context for the center predicted object location 234. The vehicle 208 (e.g., the predicted object trajectory refinement system 214 of the cascaded object trajectory determination system 210 configured at the vehicle 208) may refine the trajectory 236 as described herein based on the context determined for the predicted object location 234. For example, the vehicle 208 may adjust the location of the center predicted object location 234 from an initially determined coarse location prediction to the refined predicted object location 234 based on the associated context.

Figure 2D:
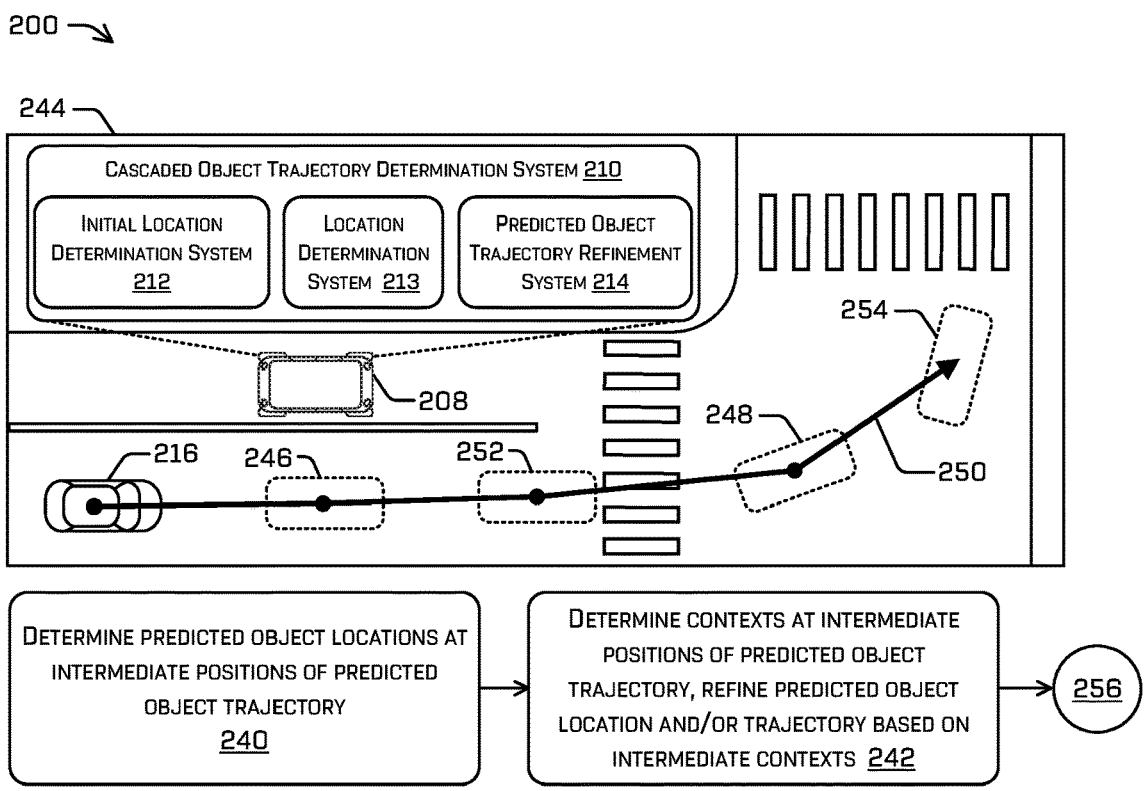

Referring now to FIG. 2D, at operation 240 the vehicle computing system may determine intermediate predicted object locations for the object that may be between those predicted object locations used in previous operations. For example, the refined predicted object locations for the object determined at operation 230 and/or one or more contexts associated therewith may be used to determine coarse intermediate predicted object locations between the predicted object locations used in previous refinement operations. For instance, using the refined context determined for the terminal endpoint of the predicted object trajectory that may have been determined at operation 230, the refined context determined for center point of the predicted object trajectory that may have been determined at operation 230, and/or the (e.g., also possibly refined) context determined for the current object location, the vehicle computing system may determine one or more coarse predicted central locations for the object between the current object location and the center point of the predicted object trajectory and between the center point of the predicted object trajectory and the terminal end of the predicted object trajectory.

At operation 242, the vehicle computing system may determine the contexts at the coarse intermediate predicted object locations. The vehicle computing system may use these contexts to perform (e.g., a third or subsequent) refinement of the intermediate predicted object locations and/or any other locations determined for the object along its trajectory. This refinement may also include any of the refinement operations described herein, including adjusting any of the predicted object locations at the terminal end of the trajectory, the center of the trajectory, and any intermediate locations based on the determined contexts for the intermediate locations. The process 200 may proceed to operation 256 described in regard to FIG. 2E below.

An example 244 illustrates the exemplary portion of the environment in which a vehicle 208 may be traveling discussed in the previous examples. The refined predicted object trajectory 250 may represent a refinement of the previously refined predicted object trajectory 236 described in regard to the example 232. In particular, as shown in this example, the object location 254 at the terminal end of the refined predicted object trajectory 250 may be adjusted from the terminal end predicted object location 238 of the trajectory 236 in example 232. Any other trajectory characteristics, locations, etc., may also be adjusted as described herein.

The vehicle 208 (e.g., the location determination system 213 of the cascaded object trajectory determination system 210 configured at the vehicle 208) may determine coarse location predictions for an intermediate predicted object location 246 and an intermediate predicted object location 248 for the vehicle 216 at the points (e.g., centrally) between the current location of the vehicle 216 and the center predicted object location 252 and between the center predicted object location 252 and the terminal end predicted object location 254, respectively. The vehicle 208 (e.g., the predicted object trajectory refinement system 214 of the cascaded object trajectory determination system 210 configured at the vehicle 208) may further determine contexts for the coarse location predictions for intermediate predicted object locations 246 and 248. The vehicle 208 (e.g., the predicted object trajectory refinement system 214 of the cascaded object trajectory determination system 210 configured at the vehicle 208) may refine the locations of the coarse location predictions of intermediate predicted object locations 246 and 248 as described herein based on the contexts determined for these intermediate predicted object locations 246 and 248.

Figure 2E:
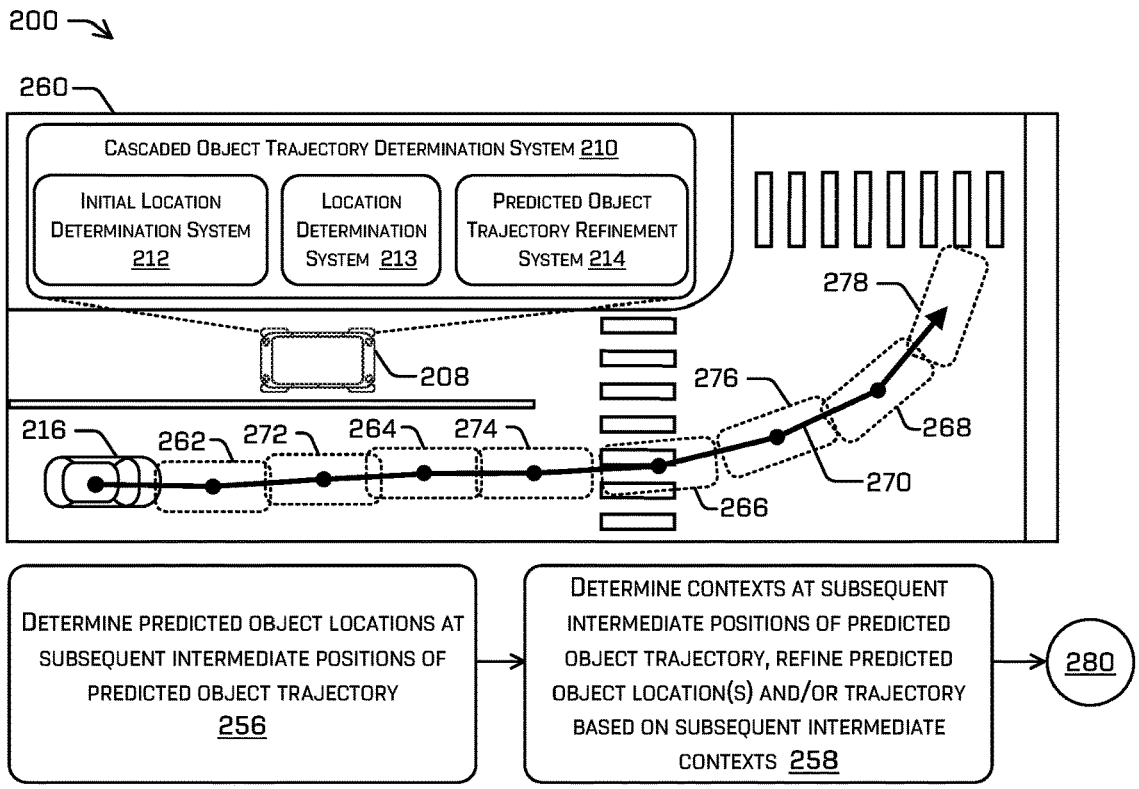

Referring now to FIG. 2E, at operation 256 the vehicle computing system may determine subsequent intermediate predicted object locations for the object that may be between the predicted object locations used in previous operations. For example, the refined predicted object locations determined at operation 242 and/or one or more contexts associated therewith may be used to determine additional intermediate predicted object locations between the predicted object locations used in previous refinement operations. For instance, using the refined contexts and locations determined for the current location of the object, the terminal endpoint, the center point, and the intermediate object locations that may have been determined at operation 242 and other operations, the vehicle computing system may determine one or more predicted central locations for the object with respect to the predicted object trajectory between the previously determined predicted and/or current object locations.

At operation 258, the vehicle computing system may determine the contexts at these newly determined intermediate predicted object locations. The vehicle computing system may use these contexts to perform refinements of these intermediate locations. These refinements may include any of the refinement operations described herein, including adjusting any of the predicted and/or current object locations and their associated contexts. The process 200 may proceed to operation 280 described in regard to FIG. 2F below.

An example 260 illustrates the exemplary portion of the environment in which a vehicle 208 may be traveling discussed in the previous examples. The refined predicted object trajectory 270 may represent a refinement of the previously refined predicted object trajectory 250 described in regard to the example 244. One or more of the predicted object locations determined for the trajectory 250 may have been adjusted in determining the refined predicted object trajectory 270. Any other trajectory characteristics, locations, etc., may also be adjusted as described herein.

The vehicle 208 (e.g., the location determination system 213 of the cascaded object trajectory determination system 210 configured at the vehicle 208) may determine intermediate predicted object locations 262, 264, 266, and 268 which may be between the current location of the vehicle 216 and the predicted object locations 272, 274, 276, and 278 that may be potentially refined locations determined in previous operations as described above. The vehicle 208 (e.g., the predicted object trajectory refinement system 214 of the cascaded object trajectory determination system 210 configured at the vehicle 208) may further determine contexts for the intermediate predicted object locations 262, 264, 266, and 268. The vehicle 208 (e.g., the predicted object trajectory refinement system 214 of the cascaded object trajectory determination system 210 configured at the vehicle 208) may refine these locations as described herein based on the contexts determined for the intermediate predicted object locations 262, 264, 266, and 268.

Figure 2F:
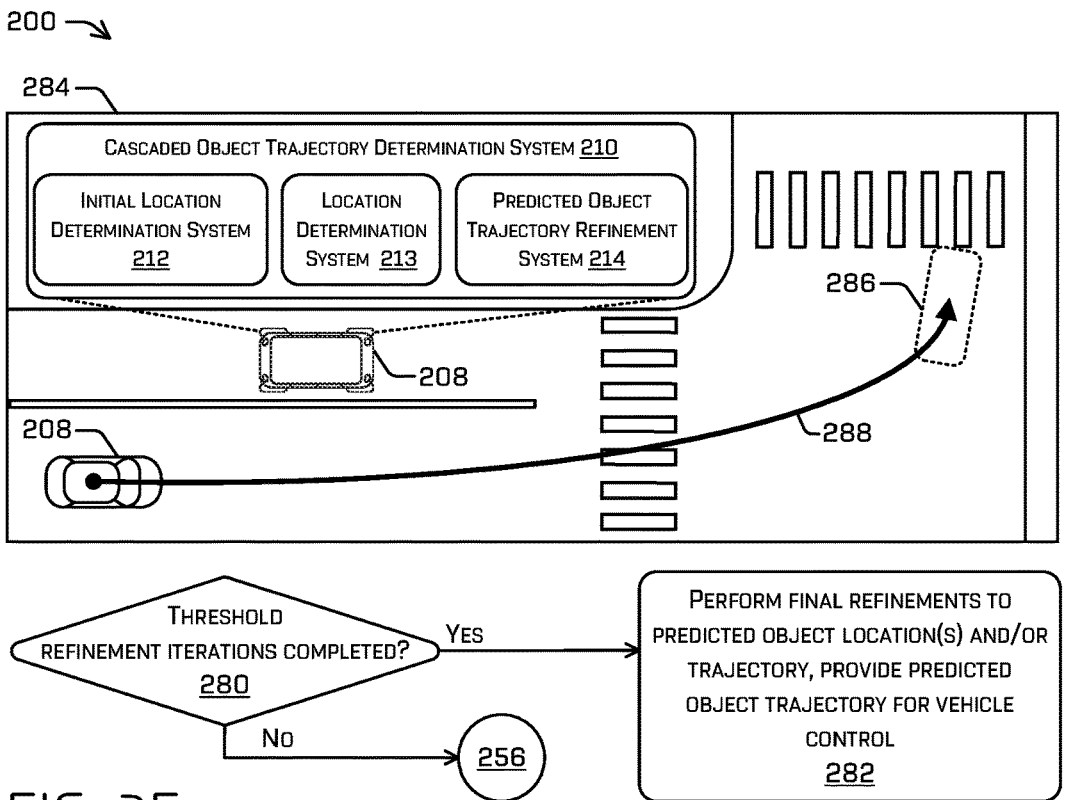

Referring now to FIG. 2F, at operation 280 the vehicle computing system may determine whether a threshold number of iterations of the refinement process have been completed. Alternatively or additionally, the vehicle computing system may determine whether other criteria have been met that may indicate whether further refinement operations should be performed (e.g., as described herein). If the vehicle computing system determines additional refinement operations are to be performed, the process 200 may return to operation 256 for further determinations of intermediate predicted object locations and location and/or context refinements.

If the vehicle computing system determines that no additional refinement operations are to be performed at operation 280, at operation 282, the vehicle computing system may, in some examples, perform any additional refinements that it may be configured to perform. The vehicle computing system may further provide the refined predicted object trajectory for vehicle control, for example, to a planning component for use in determining candidate and/or operational vehicle trajectories. The vehicle computing system may also, or instead, provide any associated data, such as context data, feature map data, object location data, etc., to one or more systems and/or components for use in controlling the vehicle.

An example 284 illustrates the exemplary portion of the environment in which a vehicle 208 may be traveling discussed in the previous examples. The refined predicted object trajectory 288 may represent a refinement of the trajectory based on the location refinements performed in earlier operations. The refined predicted object trajectory 288 may represent the final refined version of this trajectory, with a final determined predicted object location 286 at the terminal end of the refined predicted object trajectory 288. This trajectory 288 may be used to control the vehicle 208 in the environment of this example.

Figure 3:
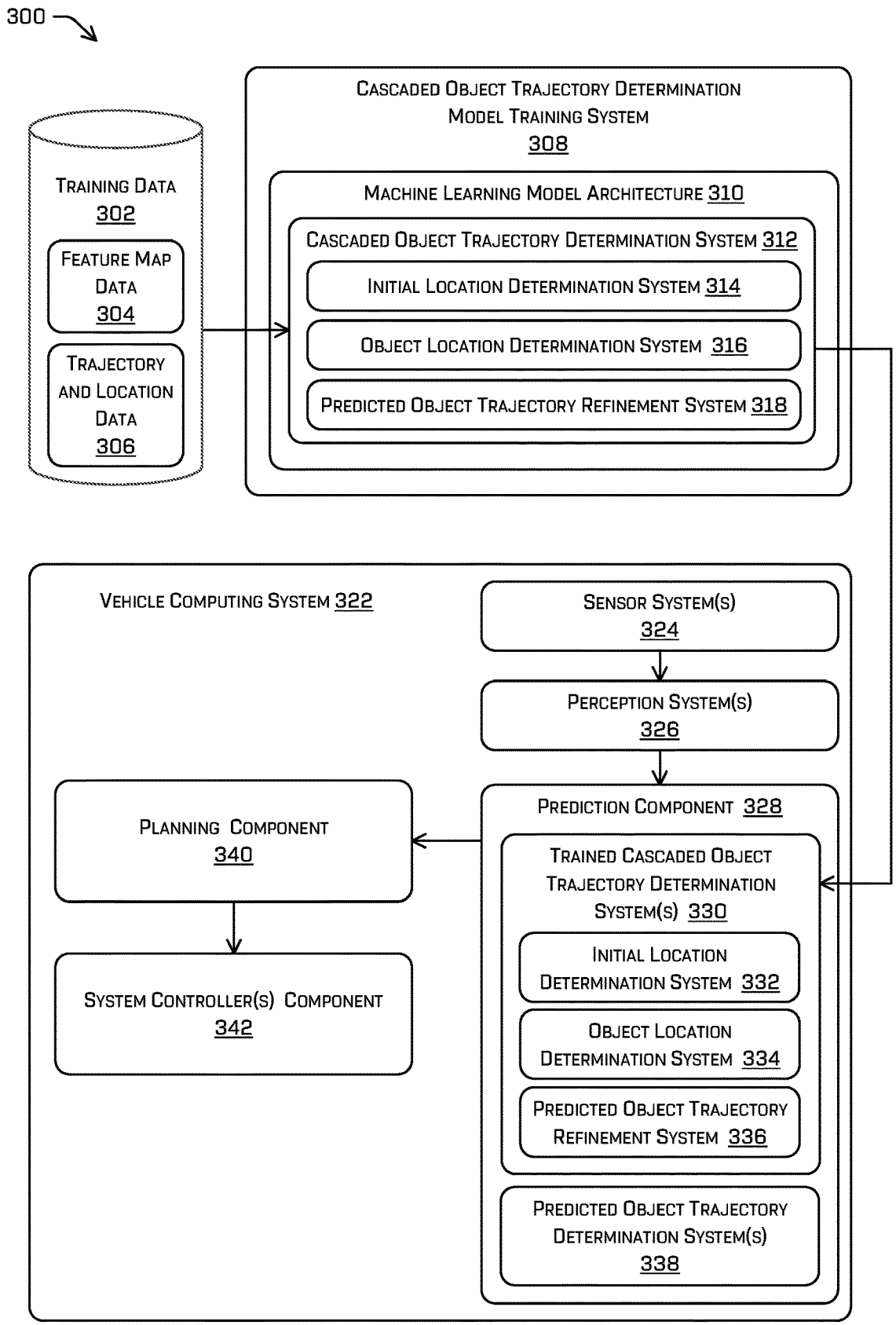
FIG. 3 is a block diagram of an example cascaded object trajectory determination system that may be configured to perform the disclosed techniques, in accordance with examples of the disclosure.
Figure 4:
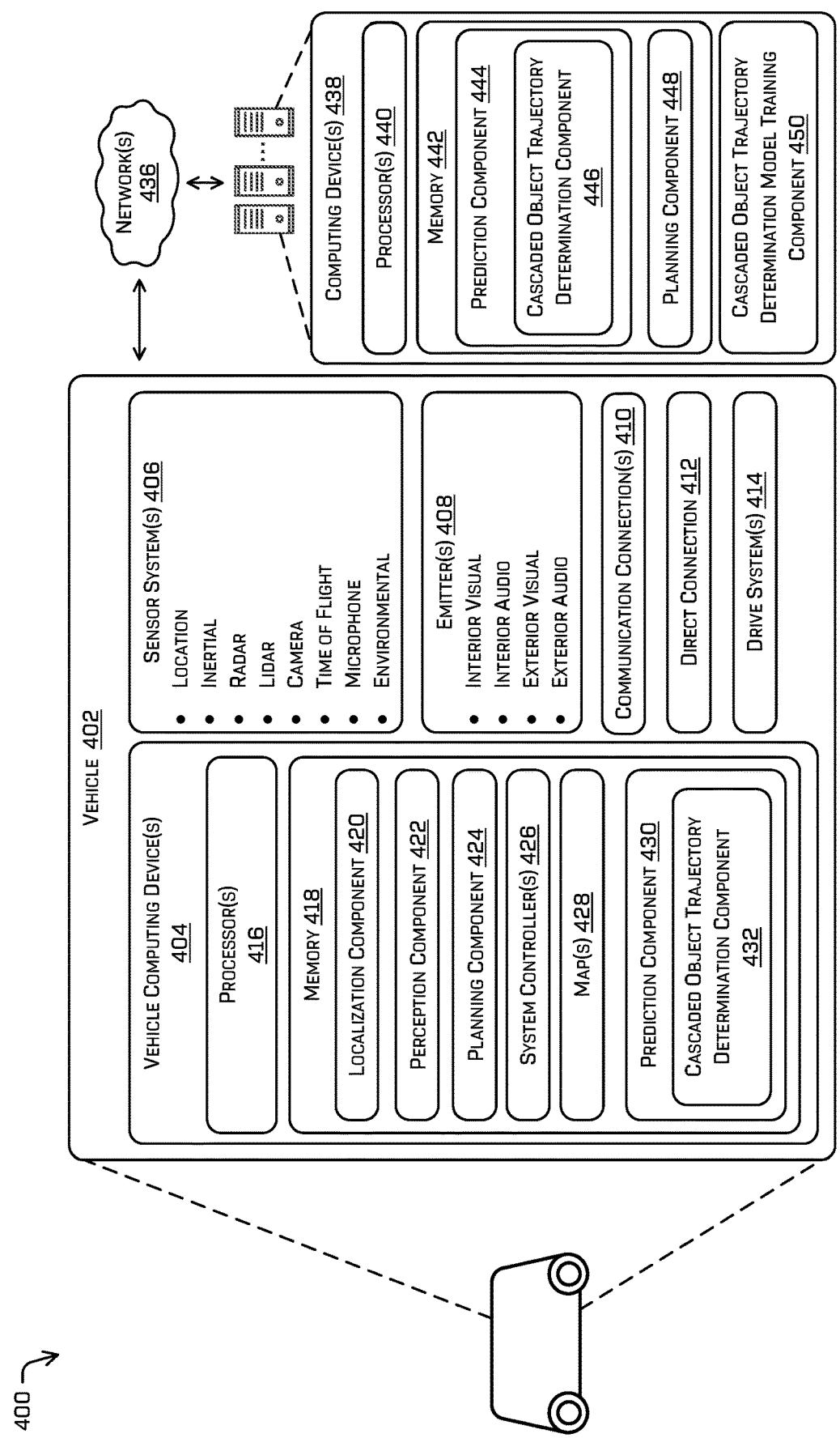
FIG. 4 depicts a block diagram of an example system for implementing various techniques described herein.

FIG. 3 is a block diagram of an example cascaded object trajectory system 300 according to various examples. The system 300 may be implemented at a vehicle (e.g., an autonomous vehicle) by a vehicle computing system and/or by a remote system. In various examples, the system may be implemented at, or interact with, a perception system, a prediction system, a tracking system, and/or planning system that may be configured to control a vehicle and/or to provide data, including trajectory data, for use in controlling a vehicle. The system 300 may include one or more of the components and systems illustrated in FIG. 4 and described below. These components may be configured as described herein or in any other configuration and may perform any subset of their associated operations in any or and/or in conjunction with other one or more other operations. For example, one or more components and systems can include those associated with processors 416 and/or 440, memories 418 and/or 442, perception component 422, planning component 424, prediction component 430, and/or cascaded object trajectory determination component 432 illustrated in FIG. 4. In examples, the one or more operations performed by the system 300 may be performed by a remote system in communication with a vehicle, such as prediction component 444, planning component 448, cascaded object trajectory determination component 446, and/or cascaded object trajectory determination model training component 450 illustrated in FIG. 4. In still other examples, the one or more operations performed by the system 300 may be performed by a combination of a remote system and a vehicle computing system. However, the system 300 is not limited to such components and systems, and the components and systems of FIG. 4 are not limited to performing the operations performed by the components of system 300.

The system 300 may include a cascaded object trajectory determination model training system 308 and a vehicle computing system 322 that may execute one or more models trained by the cascaded object trajectory determination model training system 308. The vehicle computing system 322 and/or one or more of its components may be configured at a vehicle (e.g., an autonomous vehicle). The cascaded object trajectory determination model training system 308 may be implemented at a vehicle computing system and/or at a remote system.

Training data 302 may be generated, determined, received, and/or provided to the cascaded object trajectory determination model training system 308. In various examples, the training data 302 may include feature map data 304 that may be based on and/or represent data determined based on sensor data collected in an environment. Feature map data 304 may include one or more top-down images of pixels representing feature data and/or one or more data structures of any type that may include or represent any type of feature data. The training data 302 may also, or instead, include trajectory and location data 306 that may contain one or more data structures representing object trajectories and/or vehicle trajectories, locations, and/or any associated data. In some examples, the data 304 and 306 may be combined in shared data structures.

Training data 302, including either or both of feature map data 304 and trajectory and location data 306, may include data based on lidar data, radar data, sonar data, vision data, infrared data, ultrasonic data, time-of-flight data, etc. Training data 302 may also, or instead, include any type of two-dimensional data and/or three-dimensional data that may be associated with an environment. For example, training data 302 may include one or more images of one or more portions of an environment (e.g., based on any type of sensor data). Training data 302 may also, or instead, include three-dimensional data associated with an environment that includes and/or may be used to determine three-dimensional environmental data. Training data 302 may further include labels and/or labeling information that may be associated with two-dimensional data (e.g., pixels) and/or three-dimensional data (e.g., voxels). Training data 302 may include one or more multichannel data structures with individual channels representing data associated with a particular type of sensor or particular sensor system (e.g., vision, lidar, radar, sonar, time-of-flight, etc.) and/or one or more other types of data.

The training data 302 may be provided to the cascaded object trajectory determination model training system 308 that may be configured with a machine learning model architecture 310 (e.g., that may include one or more neural networks of any type and/or any other machine learning model components) that may be configured to train a cascaded object trajectory determination system 312 to determine predicted object locations and refined predicted object trajectories as described herein. For example, the cascaded object trajectory determination system 312 may include an initial location and determination system 314 (e.g., an initial location determination model) that may be trained to determine, based on feature map pixels and/or other representations of an environment, predicted locations of objects in an environment based on a context of current locations of such objects. The cascaded object trajectory determination system 312 may also, or instead, include an object location determination system 316 (e.g., an object location determination model) that may be trained to determine an object location between two other locations of the object received as input. The cascaded object trajectory determination system 312 may also, or instead, include a predicted object trajectory refinement system 318 (e.g., a predicted object trajectory refinement model) that may be trained to determine, based on output data from a location and context prediction model or system (e.g., object predicted locations and associated contexts) and/or predicted object trajectories, refined predicted object trajectories as described herein.

In various examples, the cascaded object trajectory determination model training system 308 may transmit or otherwise provide a trained cascaded object trajectory determination system 330, in examples including a trained initial location determination system 332 and/or a trained predicted object trajectory refinement system 336, to a prediction component 328 configured at a vehicle computing system 322. The trained cascaded object trajectory determination system may also include an object location determination system 334 that may be a machine-learned model or may be a component configured to perform one or more location determination operations, for example, using linear interpolation to determine a location between two points. The prediction component 328 may also include one or more predicted object trajectory determination system 332 as described above that may provide additional or alternative predicted object trajectories for objects detected in an environment. The prediction component 328 and/or the components configured therein may receive data, such as feature maps, mapping data, sensor data, etc. from a perception system 326 that may determine such data based on sensor data received from one or more sensor systems 324. This received data may be used by one or more of the trained cascaded object trajectory determination system 330, the trained initial location determination system 332, the trained predicted object trajectory refinement system 336, and/or one or more predicted object trajectory determination system 338 to determine one or more predicted object trajectories.

In examples, as described herein, the trained predicted object trajectory refinement system 336 may be configured to receive, as input, a particular location and a context associated with a particular location. In further examples, the trained predicted object trajectory refinement system 336 may be configured to receive, as input, an indication of other locations associated with the received particular location and their associated contexts. For example, where the particular location received as input is an intermediate point, the trained predicted object trajectory refinement system 336, may also receive location data for the point between which the intermediate pint is location and/or the associated contexts. This data may be provided as a delta or distance from the intermediate point to the individual other points. The input to the trained predicted object trajectory refinement system 336 may also, or instead, include a trajectory index associated with the location (e.g., indication of a trajectory time or distance associated with the particular input location).

As an output, the trained predicted object trajectory refinement system 336 may provide an adjusted location of the particular input location and/or a context associated with such an adjusted location. This output may be used to determine a predicted object trajectory. Alternatively or additionally, this output may be provided independently as a location to one or more components (e.g., a prediction component and/or another component configured at a prediction component). This output may provide a "snapshot" of an object at a point in the future that may be used for a variety of operations by, for example, any of the systems and components described herein.

The vehicle computing system 322 may be deployed to an operational environment and may autonomously traverse such an environment. While operating in an environment, the perception system 326 of the vehicle computing system 322 may detect and label objects and/or otherwise generate one or more feature maps representing the environment based on data received from the vehicle's sensor system(s) 332. The perception system 326 may provide this data to the prediction component 328 and/or the components configured therein for predicted object trajectory determinations.

The prediction component 328 may provide such predicted object trajectories to a planning component 340 that may use the predicted object trajectories to determine one or more candidate vehicle trajectories and/or one or more operations vehicle trajectories that may be used to control a vehicle through an environment. The planning component 340 may provide such trajectories and/or instructions based on such trajectories to a system controller(s) component 342 to perform vehicle control operations.

FIG. 4 depicts a block diagram of an example system 400 for implementing the techniques described herein. In at least one example, the system 400 can include a vehicle 402. The vehicle 402 can include a vehicle computing system or device 404 that may function as and/or perform the functions of a vehicle controller for the vehicle 402. The vehicle 402 can also include one or more sensor systems 406, one or more emitters 408, one or more communication connections 410, at least one direct connection 412, and one or more drive systems 414.

The vehicle computing device 404 can include one or more processors 416 and memory 418 communicatively coupled with the one or more processors 416. In the illustrated example, the vehicle 402 is an autonomous vehicle; however, the vehicle 402 could be any other type of vehicle. In the illustrated example, the memory 418 of the vehicle computing device 404 stores a localization component 420, a perception component 422, a planning component 424, one or more system controllers 426, one or more maps 428, a prediction component 430, and/or one or more cascaded object trajectory determination components 432. Though depicted in FIG. 4 as residing in memory 418 for illustrative purposes, it is contemplated that each of the localization component 420, the perception component 422, the planning component 424, the one or more system controllers 426, the one or more maps 428, the prediction component 430, and/or the one or more cascaded object trajectory determination components 432 can additionally, or alternatively, be accessible to the vehicle 402 (e.g., stored remotely). Alternatively or additionally, the one or more cascaded object trajectory determination components 432 may be a component of and/or associated with a remote computing device and/or a separate (e.g., secondary) computing device.

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory and/or for generating map data, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 422 can provide processed sensor data that indicates one or more characteristics associated with a detected entity (e.g., a tracked object) and/or the environment in which the entity is positioned. The perception component 422 may use multichannel data structures, such as multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer (s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 424 can determine a path for the vehicle 402 to follow to traverse through an environment. In examples, the planning component 424 can determine various routes and trajectories and various levels of detail. For example, the planning component 424 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate. In some examples, the planning component 424 may include one or more cascaded object trajectory determination components 432 that may be configured to perform one or more of the operations described herein to determine predicted object trajectories.

In at least one example, the vehicle computing device 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

The memory 418 can further include one or more maps 428 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 428 can include at least one map (e.g., images and/or a mesh). In some examples, the vehicle 402 can be controlled based at least in part on the maps 428. That is, the maps 428 can be used in connection with the localization component 420, the perception component 422, and/or the planning component 424 to determine a location of the vehicle 402, identify objects in an environment, and/or generate routes and/or trajectories to navigate within an environment.

In some examples, the one or more maps 428 can be stored on a remote computing device(s) (such as the computing device(s) 438) accessible via network(s) 436. In some examples, multiple maps 428 can be stored based on, for example, a characteristic (e.g., type of entity, time of day, day of week, season of the year, etc.). Storing multiple maps 428 can have similar memory requirements but increase the speed at which data in a map can be accessed.

In general, the prediction component 430 can generate predicted trajectories of objects in an environment. For example, the prediction component 430 can generate one or more predicted trajectories for vehicles, pedestrians, animals, and the like within a threshold distance from the vehicle 402. In some instances, the prediction component 430 can measure a trace of an object and generate a trajectory for the object based on observed and predicted behavior. The prediction component 430 may interact with the planning component 424 and/or the cascaded object trajectory determination component 432 as described herein to determine predicted object trajectories.

In some instances, aspects of some or all of the components discussed herein can include any models, algorithms, and/or machine learning algorithms. For example, in some instances, the components in the memory 418 (and the memory 442, discussed below) can be implemented as a neural network. For instance, the memory 418 may include a deep tracking network that may be configured with a convolutional neural network (CNN). The CNN may include one or more convolution/deconvolution layers. Alternatively, or in addition, the cascaded object trajectory determination component 432 may include or be implemented by a CNN that may perform operations as described herein.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a braking trajectory. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decision tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 406 can include multiple instances of each of these or other types of sensors. For instance, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via the one or more networks 436, to the one or more computing device(s) at a particular frequency, after a lapse of a predetermined period of time, in near real-time, etc.

The vehicle 402 can also include one or more emitters 408 for emitting light (visible and/or non-visible) and/or sound. The emitter(s) 408 in an example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as network(s) 436. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In some examples, the vehicle 402 can send sensor data, audio data, collision data, and/or other types of data to one or more computing device(s) 438 via the network(s) 436. In some examples, the vehicle 402 can send raw sensor data to the computing device(s) 438. In other examples, the vehicle 402 can send processed sensor data and/or representations of sensor data (e.g., multichannel data structures representing sensor data) to the computing device(s) 438. In some examples, the vehicle 402 can send sensor data to the computing device(s) 438 at a particular frequency, after a lapse of a predetermined period of time, in near real-time, etc. In some cases, the vehicle 402 can send sensor data (raw or processed) to the computing device(s) 438 as one or more log files.

The computing device(s) 438 can include processor(s) 440 and a memory 442 storing one or more prediction components 444, planning components 448, and/or a cascaded object trajectory determination component 446. In some instances, the cascaded object trajectory determination component 446 can substantially correspond to cascaded object trajectory determination component 432 and can include substantially similar functionality. In some instances, the planning component 448 can substantially correspond to the planning component 424 and can include substantially similar functionality. In some instances, the prediction component 444 can substantially correspond to the prediction component 430 and can include substantially similar functionality.

The processor(s) 416 of the vehicle 402 and the processor(s) 440 of the computing device(s) 438 can be any suitable processor capable of executing instructions to process data and perform operations as described herein. By way of example and not limitation, the processor(s) 416 and 440 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The computing device 438 may further include a cascaded object trajectory determination model training component 450 that may be configured to train one or more models to perform the operations described herein. For example, the cascaded object trajectory determination model training component 450 may substantially correspond to the cascaded object trajectory determination model training system 308 of FIG. 3 and can include substantially similar functionality.

Memory 418 and 442 are examples of non-transitory computer-readable media. The memory 418 and 442 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 438 and/or components of the computing device(s) 438 can be associated with the vehicle 402. That is, the vehicle 402 can perform one or more of the functions associated with the computing device(s) 438, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing computer-executable instructions that, when executed, cause the one or more processors to perform operations comprising: determining a feature map based at least in part on sensor data associated with an environment; determining, based at least in part on a first machine-learned (ML) model, an initial object location, and the feature map, a first predicted object location for the object in the environment; determining, based at least in part on the feature map and the first predicted object location, a first coarse predicted object location for the object between the initial object location and the first predicted object location; determining, based at least in part on the first coarse predicted object location, a first context associated with the first coarse predicted object location; determining, by a second ML model, based at least in part on the first context and the first coarse predicted object location, a first refined predicted object location for the object; determining, based at least in part on the first refined predicted object location and the initial object location, a second coarse predicted object location for the object in the environment, wherein the second coarse predicted object location is spatially between the first refined predicted object location and the initial object location; determining, based at least in part on the feature map and the second coarse predicted object location, a second context associated with the second coarse predicted object location; determining, by the second ML model, based at least in part on the second context and the second coarse predicted object location, a second refined predicted object location for the object; determining, based at least in part on the first refined predicted object location and the second refined predicted object location, a refined predicted object trajectory; and controlling a vehicle based at least in part on the refined predicted object trajectory.

B: The system of paragraph A, wherein the determining the second context is by the second ML model and comprises receiving, as input at the second ML model, one or more of: the first refined predicted object location; a third context associated with the first refined predicted object location; the initial object location; or a fourth context associated with the initial object location.

C: The system of paragraph A or B, further comprising a second prediction component in addition to a first prediction component configured to determine the refined predicted object trajectory, wherein the second prediction component is configured to, concurrently with the first prediction component, determine one or more predictions for the object from the initial object location.

D: The system of paragraph C, wherein the second prediction component iteratively determines the one or more predictions wherein individual predictions of the one or more predictions for a first time follows a previous one of the one or more predictions for a second time that is earlier than the first time.

E: The system of any of paragraphs A-D, wherein controlling the vehicle based at least in part on the refined predicted object trajectory comprises using the refined predicted object trajectory to determine an operational trajectory to control the vehicle to avoid the object in the environment.

F: One or more non-transitory computer-readable media storing instructions executable by one or more processors, wherein the instructions, when executed, cause the one or more processors to perform operations comprising: determining a first predicted intermediate object location for an object in an environment, the first predicted intermediate object location being between an initial location and a final location; executing a machine-learned (ML) model to determine, based at least in part on the first predicted intermediate object location and a first context associated with the first intermediate predicted object location, a first refined predicted object location for the object; determining a second predicted intermediate object location for the object in the environment, the second predicted intermediate object location being between the initial location and the first refined predicted object location; executing the ML model to determine, based at least in part on the first refined predicted object location and a second context associated with the second intermediate predicted object location, a second refined predicted object location for the object; and controlling a vehicle based at least in part on the second refined predicted object location.

G: The one or more non-transitory computer-readable media of paragraph F, wherein the first context is based at least in part on a feature vector in a feature map comprising a top-down representation of the environment determined based at least in part on sensor data associated with the environment.

H: The one or more non-transitory computer-readable media of paragraph F or G, wherein the first predicted intermediate object location is substantially equidistant from the initial location and the final location.

I: The one or more non-transitory computer-readable media of any of paragraphs F-H, wherein the final location is predicated by a machine-learned model based on the initial location and a feature map including the initial location.

J: The one or more non-transitory computer-readable media of any of paragraphs F-I, wherein second refined predicted object location is determined as being spatially between the initial location and the first refined predicted object location.

K: The one or more non-transitory computer-readable media of any of paragraphs F-J, wherein the second refined predicted object location is determined as being temporally between the initial location and the first refined predicted object location.

L: The one or more non-transitory computer-readable media of any of paragraphs F-K, wherein controlling the vehicle based at least in part on the first refined predicted object location and the second refined predicted object location comprises: sending output of the ML model to a vehicle trajectory determination component; and determining, by the vehicle trajectory determination component, a predicted object trajectory for the object; and controlling the vehicle based at least in part on the predicted object trajectory.

M: The one or more non-transitory computer-readable media of any of paragraphs F-L, wherein the first refined predicted object location is associated with a first time that is after a second time associated with the second refined predicted object location.

N: The one or more non-transitory computer-readable media of any of paragraphs F-M, wherein determining the second predicted object location comprises using linear interpolation to determine the second intermediate predicted object location based at least in part on the first refined predicted object location and the initial location.

O: A method comprising: determining, at a vehicle computing system configured at a vehicle in an environment, a first predicted object location for an object in the environment; determining, by the vehicle computing system, based at least in part on the first predicted object location and a first context associated with the first predicted object location, a first refined predicted object location for the object; determining, by the vehicle computing system, based at least in part on the first refined predicted object location and a current object location, a second predicted object location for the object in the environment, wherein the second predicted object location is between the current object location and the first refined predicted object location; determining, by the vehicle computing system, based at least in part on the second predicted object location and a second context associated with the second predicted object location, a second refined predicted object location for the object; and controlling, by the vehicle computing system, based at least in part on the second refined predicted object location, the vehicle.

P: The method of paragraph O, further comprising determining a predicted object trajectory for the object based at least in part on the first refined predicted object location and the second refined predicted object location.

Q: The method of paragraph O or P, wherein determining the second refined predicted object location comprises iteratively determining a plurality of predicted object trajectories by: iteratively determining a plurality of intermediate predicted object locations; iteratively determining a plurality of contexts associated with the plurality of intermediate predicted object locations; and iteratively determining a plurality of refined intermediate predicted object locations based at least in part on the plurality of contexts.

R: The method of any of paragraphs O-Q, wherein the first context is based at least in part on feature data associated with a pixel in a feature map, wherein the pixel is associated with the first predicted object location.

S: The method of any of paragraphs O-R, wherein the first context is based at least in part on a feature map comprising a top-down representation of the environment determined based at least in part on sensor data associated with the environment.

T: The method of any of paragraphs O-T, wherein determining, based at least in part on the first refined predicted object location and the current object location, a second predicted object location comprises determining, based at least in part on the first refined predicted object location and the current object location, a plurality of intermediate object locations, wherein individual locations of the plurality of intermediate locations are between the current object location and the first refined predicted object location.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
determining a feature map based at least in part on sensor data associated with an environment;
determining, by a machine-learned (ML) model and based at least in part on an initial object location of an object and the feature map, a first predicted object location for the object in the environment;
determining, based at least in part on the feature map and the first predicted object location, a first predicted intermediate object location for the object between the initial object location and the first predicted object location, the first predicted intermediate object location based at least in part on a time horizon of a predicted object trajectory of the object;
determining, based at least in part on the first predicted object location, a first context associated with the first predicted intermediate object location;
determining, by the ML model, based at least in part on the first context and the first predicted intermediate object location, a first refined predicted object location for the object;
determining, based at least in part on the first refined predicted object location and the initial object location, a second predicted intermediate object location for the object in the environment, wherein the second predicted intermediate object location is spatially between the first refined predicted object location and the initial object location;

determining, based at least in part on the feature map and the second predicted intermediate object location, a second context associated with the second predicted intermediate object location;

determining, by the second ML model, based at least in part on the second context and the second predicted intermediate object location, a second refined predicted object location for the object;

determining, based at least in part on the first refined predicted object location and the second refined predicted object location, a refined predicted object trajectory; and controlling a vehicle based at least in part on the refined predicted object trajectory.

2. The system of claim 1, wherein the determining the second context is by the second ML model and comprises receiving, as input at the second ML model, one or more of:
the first refined predicted object location;
a third context associated with the first refined predicted object location;
the initial object location; or
a fourth context associated with the initial object location.

3. The system of claim 1, further comprising a second prediction component in addition to a first prediction component configured to determine the refined predicted object trajectory, wherein the second prediction component is configured to, concurrently with the first prediction component, determine one or more predictions for the object from the initial object location.

4. The system of claim 3, wherein the second prediction component iteratively determines the one or more predictions wherein individual predictions of the one or more predictions for a first time follows a previous one of the one or more predictions for a second time that is earlier than the first time.

5. The system of claim 1, wherein controlling the vehicle based at least in part on the refined predicted object trajectory comprises using the refined predicted object trajectory to determine an operational trajectory to control the vehicle to avoid the object in the environment.

6. One or more non-transitory computer-readable media storing instructions executable by one or more processors, wherein the instructions, when executed, cause the one or more processors to perform operations comprising:
determining a first predicted intermediate object location for an object in an environment, the first predicted intermediate object location being between an initial location and a final location of a predicted object trajectory, the first predicted intermediate object location based at least in part on a time horizon of the predicted object trajectory;
executing a machine-learned (ML) model to determine, based at least in part on the first predicted intermediate object location and a first context associated with the first predicted intermediate object location, a first refined predicted object location for the object;
determining a second predicted intermediate object location for the object in the environment, the second predicted intermediate object location being between the initial location and the first refined predicted object location;
executing the ML model to determine, based at least in part on the first refined predicted object location and a second context associated with the second predicted intermediate object location, a second refined predicted object location for the object;

determining, based at least in part on the first refined predicted object location and the second refined predicted object location, a refined predicted object trajectory; and controlling a vehicle based at least in part on the refined predicted object trajectory.

7. The one or more non-transitory computer-readable media of claim 6, wherein the first context is based at least in part on a feature vector in a feature map comprising a top-down representation of the environment determined based at least in part on sensor data associated with the environment.

8. The one or more non-transitory computer-readable media of claim 6, wherein the first predicted intermediate object location is substantially equidistant from the initial location and the final location.

9. The one or more non-transitory computer-readable media of claim 6, wherein the final location is predicted by a machine-learned model based on the initial location and a feature map including the initial location.

10. The one or more non-transitory computer-readable media of claim 6, wherein the second refined predicted object location is determined as being spatially between the initial location and the first refined predicted object location.

11. The one or more non-transitory computer-readable media of claim 6, wherein the second refined predicted object location is determined as being temporally between the initial location and the first refined predicted object location.

12. The one or more non-transitory computer-readable media of claim 6, wherein controlling the vehicle comprises:
sending output of the ML model to a vehicle trajectory determination component; and
determining, by the vehicle trajectory determination component and based at least in part on the refined predicted object trajectory, a predicted vehicle trajectory for the vehicle; and
controlling the vehicle based at least in part on the predicted vehicle trajectory.

13. The one or more non-transitory computer-readable media of claim 6, wherein the first refined predicted object location is associated with a first time that is after a second time associated with the second refined predicted object location.

14. The one or more non-transitory computer-readable media of claim 6, wherein determining the second predicted intermediate object location comprises using linear interpolation to determine the second predicted intermediate object location based at least in part on the first refined predicted object location and the initial location.

15. A method comprising:
determining, at a vehicle computing system configured at a vehicle in an environment, a first predicted object location for an object in the environment, the first predicted object location associated with a predicted object trajectory;
determining, by the vehicle computing system, based at least in part on the first predicted object location and a first context associated with the first predicted object location, a first refined predicted object location for the object;
determining, by the vehicle computing system, based at least in part on the first refined predicted object location and a current object location, a second predicted object location for the object in the environment, wherein the second predicted object location is between the current object location and the first refined predicted object location;

determining, by the vehicle computing system, based at least in part on the second predicted object location and a second context associated with the second predicted object location, a second refined predicted object location for the object;

determining, based at least in part on the first refined predicted object location and the second refined predicted object location, a refined predicted object trajectory representing a refinement of the predicted object trajectory; and controlling, by the vehicle computing system and based at least in part on the refined predicted object trajectory, the vehicle.

16. The method of claim 15, further comprising determining the predicted object trajectory for the object based at least in part on the first refined predicted object location and the second refined predicted object location.

17. The method of claim 15, wherein determining the second refined predicted object location comprises iteratively determining a plurality of predicted object trajectories by:

iteratively determining a plurality of intermediate predicted object locations;

iteratively determining a plurality of contexts associated with the plurality of intermediate predicted object locations; and iteratively determining a plurality of refined intermediate predicted object locations based at least in part on the plurality of contexts.

18. The method of claim 15, wherein the first context is based at least in part on feature data associated with a pixel in a feature map, wherein the pixel is associated with the first predicted object location.

19. The method of claim 15, wherein the first context is based at least in part on a feature map comprising a top-down representation of the environment determined based at least in part on sensor data associated with the environment.

20. The method of claim 15, wherein determining second predicted intermediate object location comprises determining, based at least in part on the first refined predicted object location and the current object location, a plurality of intermediate object locations, wherein individual locations of the plurality of intermediate object locations are between the current object location and the first refined predicted object location.

* * * * *